United States Patent
Blad

(10) Patent No.: US 10,830,458 B2
(45) Date of Patent: Nov. 10, 2020

(54) HYDRAULIC SYSTEM

(71) Applicant: GRUNDFOS HOLDING A/S, Bjerringbro (DK)

(72) Inventor: Thomas Blad, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 33 days.

(21) Appl. No.: 15/765,346

(22) PCT Filed: Sep. 30, 2016

(86) PCT No.: PCT/EP2016/073415
§ 371 (c)(1),
(2) Date: Apr. 2, 2018

(87) PCT Pub. No.: WO2017/055544
PCT Pub. Date: Apr. 6, 2017

(65) Prior Publication Data
US 2018/0283702 A1  Oct. 4, 2018

(30) Foreign Application Priority Data

Oct. 2, 2015 (EP) .................... 15188145

(51) Int. Cl.
*F24D 19/10* (2006.01)
*F16K 11/048* (2006.01)
(Continued)

(52) U.S. Cl.
CPC .......... *F24D 19/1024* (2013.01); *F16K 1/126* (2013.01); *F16K 11/048* (2013.01);
(Continued)

(58) Field of Classification Search
CPC ................. F24D 19/1024; F24D 3/105; F24D 2220/0242; F24D 2220/0271; F24D 3/02; F16K 1/126; F16K 11/048; F16K 41/10
(Continued)

(56) References Cited

U.S. PATENT DOCUMENTS

| 1,172,833 A | * | 2/1916 | Ricker | ................. F16K 11/048 |
| | | | | 137/625.5 |
| 2,876,788 A | * | 3/1959 | Shube | .................. F16K 11/048 |
| | | | | 137/112 |

(Continued)

FOREIGN PATENT DOCUMENTS

| DE | 10 49 074 B | 1/1959 |
| DE | 19 28 575 A1 | 2/1970 |

(Continued)

OTHER PUBLICATIONS

"DE_1928575_A1_M—Machine Translation.pdf", machine translation, EPO.org, Aug. 18, 2019. (Year: 2019).*

(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A hydraulic system includes at least one pump assembly and a switching device which includes at least two switch positions. The switching device is configured such that on operation of the pump assembly in a first operating condition, the switching device is held in a stable manner in each of the at least two switch positions in each case by the hydraulic forces in the system. In a second operating condition of the pump assembly, the switching device is moved from a first switch position into a second switch position, assisted by switching energy stored in the first operating condition. The hydraulic system is configured such that in (Continued)

the first operating condition, the switching energy is stored independently of a switching-over of the switching device between the switch positions. A method is provided for operating such a hydraulic system.

25 Claims, 24 Drawing Sheets

(51) Int. Cl.
  *F24D 3/10* (2006.01)
  *F16K 41/10* (2006.01)
  *F16K 1/12* (2006.01)
  *F24D 3/02* (2006.01)

(52) U.S. Cl.
  CPC ............. *F16K 41/10* (2013.01); *F24D 3/02* (2013.01); *F24D 3/105* (2013.01); *F24D 2220/0242* (2013.01); *F24D 2220/0271* (2013.01)

(58) Field of Classification Search
  USPC .................................................. 237/8 A, 2 A
  See application file for complete search history.

(56) References Cited

U.S. PATENT DOCUMENTS

| | | | |
|---|---|---|---|
| 2,893,416 A † | 7/1959 | Hegstad | |
| 2,925,986 A * | 2/1960 | Woods | G05D 23/1925 251/57 |
| 3,461,913 A * | 8/1969 | Scott | B60H 1/00485 137/627.5 |
| 3,498,332 A * | 3/1970 | Lybrook | F16K 11/00 137/630.14 |
| 3,608,818 A | 9/1971 | Von Fellenberg | |
| 3,656,689 A * | 4/1972 | Budzich | B60H 1/00485 237/8 A |
| 3,734,132 A † | 5/1973 | Kuhnelt | |
| 3,848,800 A * | 11/1974 | Perche | F04D 15/0016 237/8 A |
| 3,897,903 A | 8/1975 | Race | |
| 2006/0130912 A1* | 6/2006 | Lodolo | F16K 11/044 137/625.27 |
| 2008/0260540 A1† | 10/2008 | Koehl | |
| 2010/0012197 A1* | 1/2010 | Liu | E03C 1/023 137/119.04 |
| 2012/0285557 A1* | 11/2012 | Ungerecht | F16K 1/123 137/528 |
| 2015/0014425 A1† | 1/2015 | Olesen | |

FOREIGN PATENT DOCUMENTS

| | | | |
|---|---|---|---|
| DE | 1928575 A1 † | 2/1970 | |
| DE | 9013992 U1 | 10/1991 | |
| EP | 0568122 A2 | 11/1993 | |
| EP | 0568122 B1 † | 12/1996 | |
| GB | 1233647 A * | 5/1971 | ........... F24D 19/006 |
| JP | 2009063169 A * | 3/2009 | ........... F16K 11/048 |
| WO | 2012/140584 A1 | 10/2012 | |

OTHER PUBLICATIONS

Improving Pumping Systems Performance—A Sourcebook for Industry 2nd Edition May 2006.
Improving Pumping System Performance—A Sourcebook for Industry, Second Edition, May 2006, 122 pages.†

\* cited by examiner
† cited by third party

HYDRAULIC SYSTEM

CROSS REFERENCE TO RELATED APPLICATIONS

This application is a United States National Phase Application of International Application PCT/EP2016/073415, filed Sep. 30, 2016, and claims the benefit of priority under 35 U.S.C. § 119 of European Application 15 188 145.5, filed Oct. 2, 2015, the entire contents of which are incorporated herein by reference.

FIELD OF THE INVENTION

The invention relates to a hydraulic system with at least one pump assembly and with a switching device as well as to a method for the operation of a hydraulic system.

BACKGROUND OF THE INVENTION

Hydraulic systems, for example heating systems are known which comprise switching devices, for example in order to open or shut off or otherwise affect flow paths. Thereby, it is known to provide such switching devices for example with an electrical drive for switching between two switch positions. Such switching devices are comparatively expensive.

Moreover, pressure-dependent switching devices and switching devices which can be actuated by way of changing the flow direction which is to say the rotation direction of a pump assembly are also known. However, it is not always possible to change the flow direction without further ado in a hydraulic system. The direction reversal of a pump assembly as a rule results in an efficiency loss. Moreover, it is disadvantageous that the valve needs to be arranged directly on the pump impeller.

SUMMARY OF THE INVENTION

With regard to these problems, it is an object of the invention, to improve a hydraulic system with a pump assembly and with a switching device which can be switched between two switch positions, to the extent that a less expensive construction of the hydraulic system with an increased efficiency is rendered possible.

The hydraulic system according to the invention comprises at least one pump assembly and a switching device, wherein the switching device comprises at least two switch positions, which is to say can be switched between at least two switch positions. Such a hydraulic system can for example be a heating system and/or a system for heating service water. The hydraulic system however can also serve another purpose, for example as a cleaning system, a hydraulic control or actuation system, a system for distributing fluids or likewise, e.g. an ornamental fountain with two nozzles which are not simultaneously active.

According to the invention, one envisages the switching device being switched over between its two switch positions solely by way of hydraulic activation via the hydraulic system, which is to say via the fluid which is transferred in the hydraulic system which is to say the liquid which is transferred in the hydraulic system. Thus one can make do without a separate drive for the switching device. The switching between the switch positions, according to the invention is effected by way of a suitable activation of the pump assembly, whereupon the pump assembly changes the hydraulic forces or the hydraulic conditions in the hydraulic system such that the switching device is switched over.

For this, the switching device according to the invention is configured in a manner such that on operation of the pump assembly in a first operating condition, it is held in a stable manner in each of the at least two switch positions, in each case by way of the hydraulic forces in the system. This means that with regard to a switching device with two switch positions, according to the invention it is the case of a bistable system, in which each of the two switch positions can be autonomously held in a stable manner by way of the hydraulic pressure in the hydraulic system, so that no external holding forces, for example by way of an external drive are required. Thereby, according to the invention, the hydraulic system is configured such that there is a first operating condition, in which the switching device is stably held in its respectively reached switch position, and at least one second operating condition, in which this stability is at least temporarily lifted, in order to be able to move the switching device from the one switch position into another, preferably from the first into the second switch position.

For this, according to the invention, the switching device is configured in a manner such that in the second operating condition of the pump assembly, the switching device is moved from a first switch position into a second switch position with the help of switching energy which was stored in the first operating condition. This means that the switching energy which is necessary, in order to move the switching device from a first into a second switch position, according to the invention is stored in the first operating condition and then in a second operating condition of the pump assembly is utilized, in order to carry out a switching-over of the switching device. The switching energy according to the invention is thereby taken from the hydraulic system, which is to say from the fluid/liquid which is delivered in the hydraulic system, so that one can make do without an external drive. Thereby, according to the invention, the hydraulic system is configured such that the switching energy in the first operating condition can be stored independently of a switching of the switching device between the two switch positions. This means that it is not necessary for the switching device to be moved from the one into the other switch position for storing the switching energy. Thus, for example, the first switch position can be an idle position or starting position, in which the switching device is located with a standstill of the pump assembly. This permits the pump assembly to be put into operation starting from this condition, without the switching device firstly relocating into the second switch position. The energy is then stored in this operating condition, which when the pump assembly is put into the second operating condition, is later used as switching energy, in order to move the switching device from the first switch position into the second switch position.

The switching device can preferably be configured such that it comprises a restoring element, for example a restoring spring, which serves for holding the switching device in a defined starting position, for example a first switch position, given a standstill of the pump assembly. The switching device thus switches back into the first position by way of the restoring element, preferably on switching off the pump assembly.

The first and the second operating condition, which have been described beforehand, are preferably operating conditions, in which the pump assembly has the same rotation direction. This means that a rotation direction reversal is preferably not effected between the operating conditions.

The operating conditions are preferably differentiated by the speed of the pump assembly. With regard to the pump assembly, it is particularly the case of a centrifugal pump assembly. In particular, it can be the case of a wet-running centrifugal pump assembly. The pump assembly preferably comprises at least one pump casing with at least one impeller which rotates therein, as well as at least one motor casing or stator casing, with an electrical drive motor which is arranged therein and which drives the impeller. The drive motor is preferably settable in its speed by way of a speed controller. The pump assembly further preferably comprises a control device for the control and regulation (closed-loop control) of the pump assembly, in particular for switching over between the two switch positions of the switching device, by way of the pump assembly being brought into two different operating conditions. The control device e.g. can be arranged in a separate electronics housing which is preferably connected to the motor casing or however can also be accommodated in the motor casing itself. An external arrangement of the control device is also possible.

According to a preferred embodiment of the invention, the hydraulic system comprises at least one energy store which is configured in a manner such that on operation of the pump assembly in the first operating condition, it is subjected to a hydraulic pressure in the hydraulic system and stores switching energy in a charging procedure, wherein the switching device remains in its assumed switch position. The switching device remaining in its assumed switched position means that no switching-over into another, in particular into the second switch position is effected. This however does not rule out the switching device or a switching element in the switching device being displaced by a certain amount during the charging procedure, without effecting a switch-over. The energy store is further preferably coupled to the switching device in a force-transmitting manner, such that in the second operating condition of the pump assembly, the switching device is moved into a second switch position by a force produced by the energy store, which is to say a force produced whilst utilizing the switching energy.

The energy store can preferably be a part of the switching device. Alternatively or additionally, it is possible for a fluid, in particular a liquid in the hydraulic system, in particular a fluid which is in motion in the hydraulic system, to function as energy store. A separate energy store for example can be configured as a spring store, as a magnetic, hydraulic and/or pneumatic energy store. Such a store is subjected to the hydraulic pressure in the system and preferably an element of the energy store is moved by the hydraulic pressure, so that the energy store is charged, in particular a spring, for example a helical spring or also a gas spring is loaded.

If the fluid in the hydraulic system itself functions as an energy store, then preferably inertia forces which is to say flow energy resulting from the inertia of the fluid, are/is used as switching energy, in order to effect a switching of the switching device from one switch position into the other switch position. If the hydraulic pressure which is produced in the system is utilized to hold the switching device in its assumed switch position, then by way of switching over the operating condition of the pump assembly in the second operating condition, the pressure for example can be reduced such that the holding function is lifted. The liquid or the fluid however has a certain inertia due to it being circulated, so that the flow energy in the system does not reduce just as quickly as the pressure used for holding the switching (switched) condition. This still remaining flow energy can then be utilized for switching over from the one switch position into the other switch position.

It is possible for the size ratios of the areas (surfaces), upon which the hydraulic forces act, to be suitably adapted, in order to adapt the forces acting upon the switching device or upon a switching element of the switching device, to the hydraulic system. Thus a pressure surface, upon which the hydraulic force acts for holding the switching device in its assumed switch position, in its size can be dimensioned such that a desired holding force is given at a certain hydraulic pressure. The flow can act upon impact surfaces for moving the switching device or the switching element. These impact surfaces with regard to their size can also be dimensioned or matched such that the desired forces necessary for moving the switching device into the other switch position are produced. A desired interaction between the holding force and the force causing the movement can be achieved by way of matching the surface/area ratios.

Particularly preferably, the pump assembly in the first operating condition is operated at a speed above the limit speed and in a second operating condition is operated at a speed smaller than or equal to the limit speed, or the pump assembly is at a standstill in the second operating condition. The pressure in the hydraulic system is reduced in the previously described manner by way of the reduction of the speed, so that in particular a pressure which serves for holding the switching device in its switch position is reduced to such an extent that the switching device can be moved out of the switch position into the other switch position. The pump assembly is preferably not completely switched off in the second operating condition. This simplifies the restarting operation or a subsequent speed increase, in particular with drive motors which are controlled via frequency converter. A flow energy which assists the switch-over procedure thus moreover continues to be maintained in the system in the second operating condition. Further preferably, the pressure can be held at a level which, after switching the switching device into the other operating condition, serves for automatically holding the switching device in this second operating condition again, without immediately bringing the pump assembly into the first operating condition again.

Particularly preferably however, the pump assembly after the switching-over which is to say the change of the switch positions, is brought again into the first operating condition, in which the switch position which is then assumed, for example the second switch position, is again kept stable by the hydraulic pressure. This is particularly necessary if the second switch position is not held in a stable manner in the second operating condition, but the switching device after a certain time automatically endeavors to automatically switch back again into the first switch position. For this case, a control device of the pump assembly can be configured in a manner such that after bringing the pump assembly into the second operating condition, it brings the pump assembly into the first operating condition again at a predefined point in time or after a predefined time interval. Thereby, the point in time or the time interval is selected such that the switching device is still situated in the second switch position at this moment, so that this switch position is again held in a stable manner in the first operating condition of the pump assembly.

According to a preferred embodiment of the invention, the pump assembly comprises a speed controller for changing the speed of the pump assembly, wherein the speed controller preferably comprises a braking circuit which actively brakes the pump assembly given a reduction of the speed. Such a speed controller can be configured in the form of an electronic control device. Such an electronic control device in particular can also comprise a frequency converter for activating an electric drive motor of the pump assembly. The braking circuit permits the speed to be reduced more rapidly than would be the case with a pure running-out of the pump assembly. This permits the hydraulic pressure in the hydraulic system to be reduced particularly rapidly, so that the hydraulic pressure drops more quickly than the flow energy present in the system. The flow energy can thus be utilized for switching the switching device into another switch position in the described manner.

The energy store is further preferably configured in a manner such that on operation of the pump assembly in the first operating condition, a hydraulic pressure counteracts a force produced by the energy store and acting upon the switching device, in a manner such that a switching procedure is prevented. This means that the force which is produced by the hydraulic pressure in the first operating condition and which acts upon the switching device is greater than the force or switching force which is produced by the energy store after the charging procedure and which endeavors to move the switching device into the respective other switch position, which is to say the second switch position for example. The system therefore in the first operating condition is held in the assumed switch position in a stable manner.

The energy store preferably comprises a pressure surface which is connected to flow path in the hydraulic system, in a manner such that the pressure surface is impinged by a fluid pressure produced by the pump assembly. Thus, the fluid pressure acts upon the energy store in the manner described above, in order to transfer energy from the hydraulic system to the energy store. This can be effected for example by way of the pressure surface being displaced against a spring, as was described above.

According to a preferred embodiment of the invention, the energy store is connected to the switching device or to a movable switching element of the switching device via an elastically deformable damping element which is configured in a manner such that it deforms during the charging procedure of the energy store, without moving the switching device or its switching element, which is to say switching into the other switch position. The charging procedure of the energy store can therefore be effected without the switching device moving from the one into the other switch position. Further preferably, the damping element is arranged in a manner such that on operation of the pump assembly in the first operating condition, a hydraulic pressure acts upon the damping element, said pressure being produced by the pump assembly and counteracting a force produced by the energy store and acting upon the damping element amid elastic deformation of the damping element. The energy store for example can comprise a spring, in particular a helical spring which is compressed or stretched and produces a force counteracting the force produced by the hydraulic pressure, wherein the force produced by the hydraulic pressure is preferably so large, that the spring is held in the loaded (stressed) condition. Thereby, the energy store and the damping element are preferably arranged and connected to one another, such that the damping element is likewise compressed amid elastic deformation.

The damping element preferably has damping characteristics of such a nature, that a recovery of the damping element is effected more slowly than a discharging of the energy store, in the case of a reduction of the hydraulic pressure, for example if the pump assembly is brought into the second operating condition. As described above, the switching device is held in the first switch position in a stable manner preferably by way of the hydraulic pressure, in this first operating condition. The energy store in this condition is charged by way of the hydraulic pressure, wherein the damping element is simultaneously elastically deformed, for example compressed. If the pump assembly is now brought into the second operating condition and the hydraulic pressure is reduced to such an extent that the force acting upon the switching device is no longer large enough to hold this in the first switch position against the force produced by the energy store, then the energy store discharges, by which means the switching element or the switching device is moved into the second switch position, since the damping element does not recover as rapidly as the energy store discharges. This means that the decoupling of the charging procedure from the movement of the switching device is achieved by the damping element, but despite this a coupling exists for moving the switching device in the discharging procedure of the energy store during the second operating condition of the pump assembly.

The damping element can preferably be configured as a volume which is changeable in size and which can be filled with and emptied of fluid via a throttle location, whereby preferably the size-changeable volume is connected via the throttle location to a second size-changeable compensation volume, into a closed system. The closed system has the advantage that no contaminations can penetrate into the throttle location. Alternatively however, an open system can also be used, in which the volume of the damping element is filled with fluid from the hydraulic system and is emptied back into the hydraulic system, via the throttle location. The volume and the compensation volume are preferably delimited to the outside by a bag, for example a bellows. Alternatively, a piston-cylinder arrangement could also be applied, in order to provide a volume which is changeable in size, which is to say a compensation volume.

According to a further preferred embodiment of the invention, the damping element is provided with a restoring element, in particular a restoring spring, which effects a recovery. Such a restoring spring can be a helical spring for example. An additional restoring element is advantageous if the damping element itself has no sufficient elasticity, in order to ensure an autonomous recovery. Thus for example a helical spring can be arranged in the inside or on the outer periphery of the bellows, for example when using a bag or bellows which defines a volume changeable in size, wherein the bellows changes axially in its length in the acting direction of the spring, in order to enlarge or reduce the inner volume.

According to a further preferred embodiment, a control device of the pump assembly is configured in a manner such that it changes the operation of the pump assembly from the first operating condition into the second operating condition, for example changes the speed up to or below the previously mentioned limit speed, for initiating a switching procedure or a switch-over of the switching device for a switching pause, wherein this switching pause is shorter than a time interval duration which the recovery of the damping elements takes to accomplish. This design, after the switching of the switching device into the second switch position, permits the pump assembly to be brought again into the first operating condition, so that again an adequately high pressure is produced in the hydraulic system, and this pressure then holds the switching device in the second switch position in a stable manner. If this were not to be effected until after the deformation of the damping element, then the switching device could move back again into the first switch condition, before a stable holding condition of the switching device is reached again.

Instead of arranging a damping element between the energy store and the switching device, it is also possible to achieve a decoupling of the charging procedure of the energy store from a movement of the switching device or of a switching element in another manner and despite this to ensure the movement of the switching device into the other switch position on discharging the energy store. This for example can also be effected by way of mechanical catches which act at one side. According to a further preferred embodiment, it is possible for example to couple a pressing body with a pressure surface to an energy store, such that the energy store, for example a helical spring, is loaded or charged, by way of moving the pressing body. Thereby, the pressing body can move relative to the switching element to be moved or to the element of the switching device which is to be moved, for example to a valve element, so that the switching device or its switching element is firstly not moved. Then for example holding elements can be provided on the movable switching element, and these fix the pressing body after a certain covered distance, after which the energy store is charged. The holding elements for example can be detent/locking hooks. If the pump assembly is now brought into the second operating condition and the force which is produced by the hydraulic pressure is reduced, then the energy store can discharge and thus move the pressing body. The switching element is moved together with the pressing body when this pressing body in this condition is held on the switching element to be moved. Release means can be arranged in the switching device such that not until after a certain distance covered by the switching element, do they release the holding means in a manner such that the pressing body is released again. This can then move freely to the switching element, and in a next charging procedure the energy store can then be charged again independently of the movement of the switching element, since firstly only the pressing body moves due to the hydraulic force which acts upon it. Only after the charging of the energy store does the pressing body then via the holding means come into a fixed connection with the switching element to be moved, for example a valve element, so that this with the switch-over procedure is moved together with the pressing body by way of the discharging of the energy store.

The switching device is preferably configured as a switch-over device and in particular as a switch-over device for switching-over a flow path between at least two branches of the hydraulic system. According to a further preferred embodiment, the switching device is preferably configured as a valve, in particular as a switch-over valve which can switch the flow path between two branches of the hydraulic system. In such a switching device which is configured as a valve, at least one valve element is moved as a switching element between the two switch positions.

Such a switch-over device or such a switch-over valve can be applied for example in a heating installation, in which the flow path for the heated heating medium, for example water, is to be switched between a heating circuit through a building and a circuit through a heat exchanger for heating service water. Such hydraulic systems are applied for example in compact heating installations or heating boilers and these serve for heating a building as well as for producing heated service water. The switching device according to the invention, in such a system can replace a motorically driven switch-over valve for example.

If the hydraulic system according to the invention is a heating system, as described beforehand, then it is advantageous if the circuit through the heat exchanger for heating service water is opened in a first switch position of the switching device which corresponds to an idle position on starting operation of the system. This circuit is a defined, known circuit, since as a rule it is formed in the heating boiler itself on the part of the manufacturer. Thus the necessary energy for switching-over can be taken from this heating circuit, and be stored in an energy store in the described manner, or in the hydraulic system, for example in the form of kinetic energy of the flowing fluid. The second switch position is then preferably a switch position, in which the heating circuit through a building is opened. This heating circuit and in particular the current condition of such a heating circuit as a rule is not known, since the heating circuit can comprise a multitude of radiators with valves, whose degree of opening constantly changes.

The hydraulic system is preferably a circulation system and the pump assembly a circulation pump assembly which circulates a fluid in the circulation system. As described beforehand, this for example can be a circuit of a heating system. This could alternatively also be a circuit of a cooling system or another hydraulic system, as has been mentioned above.

A control device is preferably present in the hydraulic system and this is configured for changing the operating mode of the pump assembly between the first and the second operating condition, in order to initiate a switching procedure of the switching device. The control device in particular can effect a speed change of the pump assembly. For this, the drive motor of the pump assembly can be controlled for example via a frequency converter. Such a control moreover permits the motor to be actively braked given a speed reduction.

According to a particularly preferred embodiment of the invention, the switching device is configured as a switch-over valve with two valve seats, and comprises two associated valve bodies which are connected to one another, form a movable switching element and are arranged such that when one valve body sealing bears on its associated valve seat, the other valve body is simultaneously distanced to its associated seat and vice versa. Such a switch-over valve is preferably arranged in the hydraulic system in a manner such that on operation of the pump assembly in a first operating condition, a hydraulic pressure acts upon that valve body which bears on its associate valve seat, in a manner such that the valve body is held in contact on the valve seat. This hydraulic pressure can be transmitted for example from the exit side of the pump assembly through a closed branch of the hydraulic system onto the valve body. This branch is thereby preferably closed by the valve body itself. This means that the valve body is preferably arranged to the valve seat such that an exit-side pressure of the circulation pump assembly acts upon the valve body such that this is pressed against the valve seat. This pressure in the second operating condition is reduced to such an extent that the valve body can be moved into its second switch position, which is to say can come out of contact with the valve seat, by way of a switching force which counteracts the described holding force produced by the pressure in the hydraulic system, wherein the second valve body or the second valve element is simultaneously brought into sealing contact with its associated valve seat. Such a switching force can be produced for example by the energy store described beforehand or from an inertia force of the fluid flowing in the system.

According to a preferred embodiment of the invention, the switching device comprises at least one damping device which is configured and acts in a manner such that it damps a direct impact of the switching device on reaching at least one of the two switch positions, i.e. damps the impact. In particular, the damping device preferably acts such that it permits a certain movement of the switching device beyond the reaching of the switch position. A direct rebounding or bouncing back from the reached switch position is prevented by way of this. In particular, such a damping device is useful if the switching device is moved solely by the inertia force of the fluid which flows in the system. With such a design of the switching device, the switching device preferably comprises two coupled valve elements which are freely movable together. One can prevent the valve element from hitting the valve seat and rebounding from this again by way of the damping device. The damping element can be configured as an elastically deformable element, for example as an elastic bellows or as an elastic valve seat. According to a preferred embodiment, it can be configured as a bellows, whose inner volume is open to the outside via a throttle location. An additional damping can therefore be achieved via the throttle. Alternatively or additionally, the damping element can be configured as a hydraulic damping element, for example by way of a piston moving in a cylinder, so that a volume in the cylinder is reduced and a fluid which is located in the volume is displaced through a throttle out of the volume. Therein, the throttle in particular can be formed by a gap between the piston and the surrounding cylinder wall. Herein, the piston can further preferably be formed by the valve element itself. Further preferably, the valve element can be configured such that firstly with regard to its movement direction, it seals radially close to a sealing end position and comes to axially bear on a valve seat given a further movement.

The switching device can preferably comprise at least one linearly movable valve body or a linearly movable valve element, said body or element in a switch position sealingly bearing on an associated valve seat and being configured in a manner such that the valve body, with its movement, passes an annular wall which surrounds the outer periphery of the valve body and reduces the flow cross section, before reaching the valve seat. The annular wall herein extends parallel to the movement axis of the valve body. The annular wall forms a cross-sectional reduction of the flow path which is essentially closed by the passing valve body. The valve body can therefore in particular seal radially against the annular wall. The valve body can close the flow path through the valve seat before it comes to axially bear on the valve seat. The preferably cylindrical annular wall thereby comprises a cross section which is preferably slightly larger than the cross section of the valve body transverse to its movement direction.

The valve element or the valve body can therefore immerse for example into a surrounding cylinder and thus close the flow path through the cylinder whilst it can still move further by a certain amount in the direction of the longitudinal axis of the cylinder, before it axially abuts a valve seat. The switch position, in which the flow path is closed, is therefore reached before the movement of the valve element is stopped. This means that the impact is damped.

The described damping device has the effect that there is not only a short closure moment with the striking of the valve element or valve body on the valve seat, but that there is a longer closure time interval, in which the closure of the flow path is essentially given. The pump assembly can then be switched again into its first operating condition within this closure time interval. This means that a larger time window for the switching-over of the operating condition of the pump assembly for holding the switch position of the switching device is created by the damping device.

In the case that two coupled valve elements are provided, both valve elements can be coupled to corresponding damping devices. However, it is also possible to provide only one damping device which damps the impact of only one of the valve elements on its valve seat.

The described switching device is particularly preferably integrated into a pump casing of the pump assembly. Thereby, the switching device is preferably arranged in a switching device housing which is configured as one piece or in a single-part manner with the pump casing, in which the impeller of the pump assembly rotates. A very compact and simple construction is thus achieved. Moreover, the previously described control device which realizes the switching-over of the switching device by way of changing the operating conditions is particularly preferably integrated into the pump assembly. Such a unit of the switching device and pump assembly can then be integrated into a hydraulic system, for example into a heating installation. The subject matter of the invention is therefore also a pump assembly with a switching device which is integrated into the pump casing of the pump assembly and which is configured in the manner described previously or is configured such that it cooperates with a hydraulic system connected to the pump assembly, in the previously described manner. This means that the subject-matter of the invention is not only the hydraulic system as a whole, but also a combination of the pump assembly and switching device which preferably in the manner described beforehand are configured as an integrated construction unit. The pump assembly and the switching device are thereby configured such that they can act in the previously described manner, on connection to a hydraulic system, such as a heating installation.

Further preferably, the switching device is integrated together with a pump assembly into a hydraulic block or hydroblock for a heating facility. Such hydraulic blocks form integrated hydraulic construction units for heating facilities which comprise at least a part of the internal flow paths of the heating facility and apart from a pump assembly, which is to say preferably a circulation pump assembly, comprise further hydraulic components, thus preferably the switching device according to the invention. The switching device is integrated with the pump assembly into a common construction unit which in particular also comprises the necessary flow paths between the switching device and the pump assembly. Furthermore, further components, such as for example sensors and/or a venting device can be integrated into this hydraulic block. The hydraulic block preferably comprises conduit connections which are provided for connection to further components of a heating facility. Thus for example a first conduit connection is provided for connection to a primary heat exchanger of the heating facility. Further preferably, a second conduit connection is provided for connection to a heating circuit through a building. Furthermore, a conduit connection for connecting to a secondary heat exchanger for service water heating can preferably be provided on the hydraulic block. Particularly preferably, the connection for connecting to the primary heat exchanger is connected in the inside of the hydraulic block to the delivery side of the pump assembly, whilst the connection for the secondary heat exchanger and the connection for the heating circuit are each connected to an inlet of the switching device in the inside of the hydraulic block.

The switching device therein preferably forms a switch-over valve between a hydraulic circuit through the secondary heat exchanger and a hydraulic circuit through the heating circuit.

The subject matter of the invention is moreover a method for the operation of a hydraulic system, wherein the hydraulic system comprises a pump assembly and a switching device with at least two switch positions. This means that the switching device for example comprises a movable switching element, for example a valve element, which can be moved between two switch positions. According to the invention, the switching device in a first operating condition of the pump assembly can be held in a stable manner in each of the possible switch positions, in each case by way of the hydraulic forces in the system. The pump assembly is moreover brought into a second operating condition, in which a switching of the switching device into the respective other switch position is effected with the help of switching energy which has been previously stored in the energy store and/or the hydraulic system itself when the pump assembly was operated in the first operating condition, for switching the switching device from a first onto a second switch position or, as the case may be, a further switch position. The switching device can thus be switched over, without an external drive becoming necessary. In contrast, energy which was taken from the hydraulic system itself is utilized for the switching. The preceding description of the hydraulic system is referred to with regard to further details of the method course. It is to be understood that the method courses which are described by way of the hydraulic system likewise represent preferred features of the method according to the invention.

A hydraulic inertia force of the fluid flowing in the system is preferably utilized for switching over the switch-over device. This means that the flowing fluid itself functions as an energy store and the energy of the flowing fluid is utilized for switching over. Thereby, after bringing the pump assembly into the second operating condition, this flow energy is still available for a certain period of time, in which the switch-over is effected, due to the inertia of the fluid.

The storage of the energy or the switching energy in the first operating condition according to the invention is effected independently of a switching-over of the switching device. Thereby, the storage of the energy can alternatively or additionally be effected in a separate energy store. The independent storage has the advantage, as described above, that the switching energy can be stored, without having to relocate the switching device from its idle position representing a first switch position, into the second switch position, on starting operation of the system.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
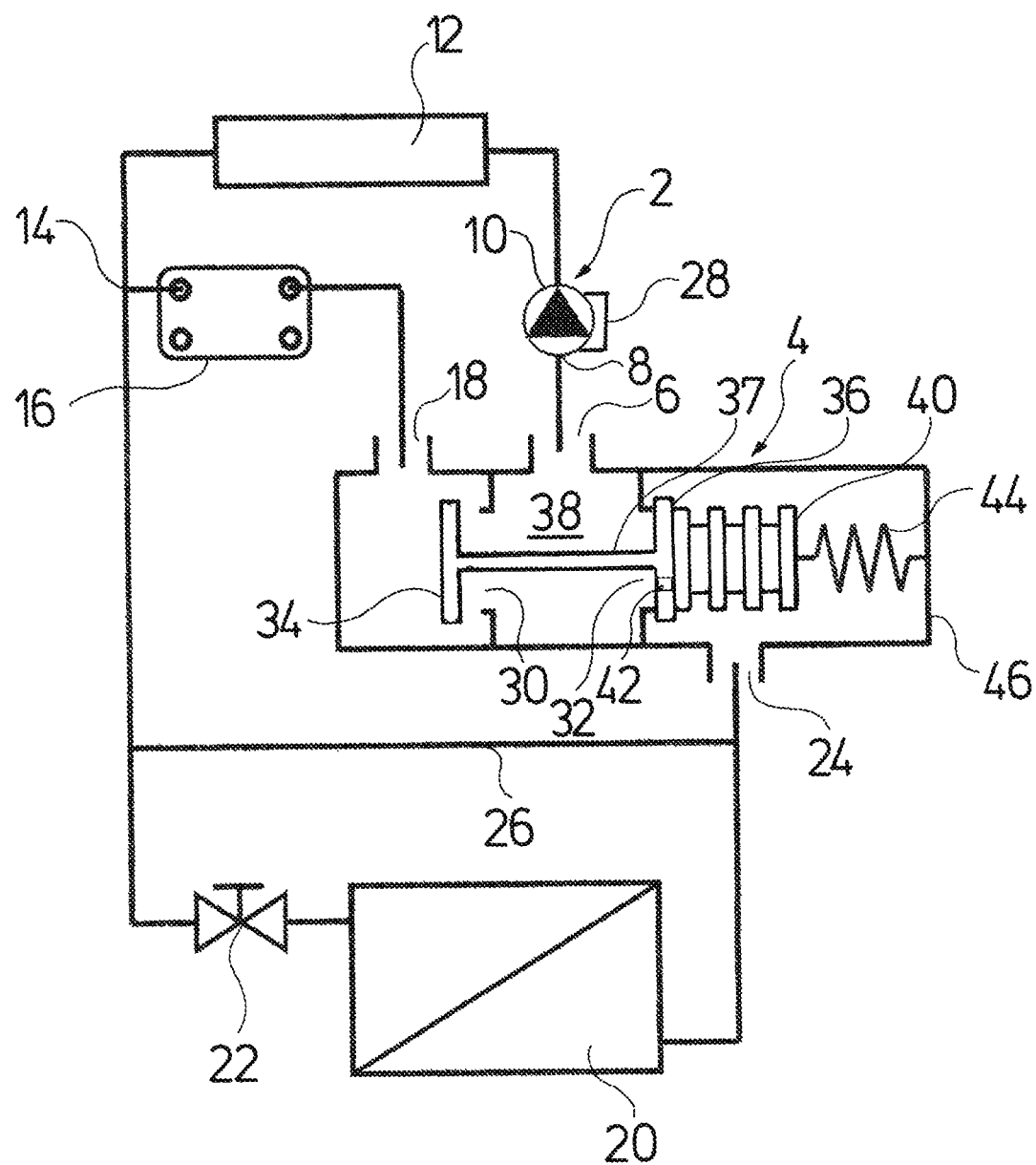
FIG. 1 is a schematic view showing a first example for a hydraulic system according to the invention, wherein the hydraulic system is in an idle condition.

Referring to the drawings, the invention is hereinafter described by way of example and by way of a hydraulic system which represents a heating system. However, it is to be understood that the invention can also be applied in other hydraulic systems, in particular in hydraulic systems, in which a switching between two flow paths is necessary. This particularly applies to a circulation system but is expressly not limited to such.

FIG. 1 shows an embodiment example of a hydraulic system according to the invention, as is applied in a heating installation, in particular compact heating installation. The hydraulic system as essential components comprises a pump assembly 2 configured as a circulation pump assembly, as well as a switching device 4 acting as a switch-over valve. The exit 6 of the switching device 4 in this example is hydraulically connected to the suction-side connection 8 of the pump assembly 2. The switching device 4 in this embodiment example thus lies at the suction side of the pump assembly 2, and this means that the pressure difference between the delivery-side connection 10 or the exit side 10 of the pump assembly 2 and the switching device 4 is larger than between the switching device 4 and the suction-side connection 8. A primary heat exchanger 12 at the exit side connects to the pump assembly 2 in the flow path in this embodiment example. The primary heat exchanger 12 for example is the heat exchanger in a heating boiler, in which the heating water is heated by way of a gas burner, oil burner or pellet burner. The heating water however can be heated in another manner in the primary heat exchanger 12, for example by way of a solar installation, heat pump or likewise. Moreover, it is to be understood that the system in a corresponding manner could also operate as a cooling system, wherein the primary heat exchanger 12 would not serve for heating, but for cooling.

A branching point or node point 14, at which the flow path branches, connects downstream of the primary heat exchanger 12. A first branch of the hydraulic system, departing from the node point 14, runs through a secondary heat exchanger 16, in which for example service water to be heated is heated. This branch of the hydraulic circuit, at the exit side of the secondary heat exchanger 16, runs out into a first entry 18 of the switching device 4. A second branch which extends in a manner departing from the node point 14 forms a heating circuit which for example serves for heating a building. This heating circuit here is represented schematically by a radiator 20 which a regulation valve 22 which is arranged on this. The regulation (control) valve 22 can for example be a common thermostat valve. This heating circuit at the exit side runs out into a second entry 24 of the switching device 4. It is to be understood that indeed such a heating circuit can comprise more than one radiator 20 which are connected in parallel and/or in series. In this example, the heating circuit yet comprises a bypass 26 which serves for permitting a flow through the heating circuit when the regulation valve 22 or all regulation valves 22 in the heating circuit are closed.

What is essential to the invention is the special design of the switching device 4 which is configured such that one can make do without a separate drive for the switching device 4 and in contrast this can be switched over solely via the circulation pump 2 by way of changing the operating condition of the pump assembly 2. This is effected by a control device 28 of the pump assembly 2. In this example, the control device 28 is integrated directly into the pump assembly, for example directly on or in the motor casing of the pump assembly 2. With regard to the pump assembly 2, it is preferably the case of a circulation pump assembly which can be closed-loop controlled in its speed and is activated via a frequency converter. This in particular is configured as a centrifugal pump assembly, preferably with a wet-running electric motor.

The switching device 4 serves for switching between the two described flow paths, which is to say on the one hand through the secondary heat exchanger 16 and on the other hand through the radiators 20 of the heating circuit. For this, the switching device comprises two valve seats 30 and 32, to which in each case a valve element 34 and 36 respectively (switching element 34 and 36) is assigned. The valve elements 34, 36 are connected to one another in a fixed manner and are arranged such that they can be alternately brought into sealing contact with the respective associated valve seat 30, 32. This means that when the valve element 36 sealingly bears on the valve seat 32, as in the condition represented in FIG. 1, the valve element 34 is distanced to its valve seat 30, so that the flow path through the valve seat 30 is opened. The valve seats 30, 32 run out into a connection space 38 which is hydraulically connected to the exit 6. In this example, the valve seats 30, 32 are away from one another and from the connection space 38. The valve element 34 faces the connection 18, so that it is subjected to onflow from the first entry 18 and is subjected to pressure. The valve element 36 faces the second entry 24 and is thus subjected to onflow through the second entry 24 and is subjected to pressure. This arrangement of the valve elements 34, 36 has the effect that the pressure prevailing at the entries 18 and 24 acts upon the valve elements 34, 36 such that these are pressed in each case against their associated valve seat 30, 32. A self-holding function of the switching device 4, as is described hereinafter is achieved by way of this.

Moreover, an elastic bellows 40 whose closed interior is in connection with the connection space 38 via a through-hole 42 in the valve element 36, is arranged on the valve element 36, away from the valve seat 32. The through-hole 42 is configured as a throttle location. A spring 44 which is configured as a tension spring engages on the end of the bellows 40 which is away from the valve element 36, and the spring at its other end is fastened on the housing 46 of the switching device 4.

Figure 2:
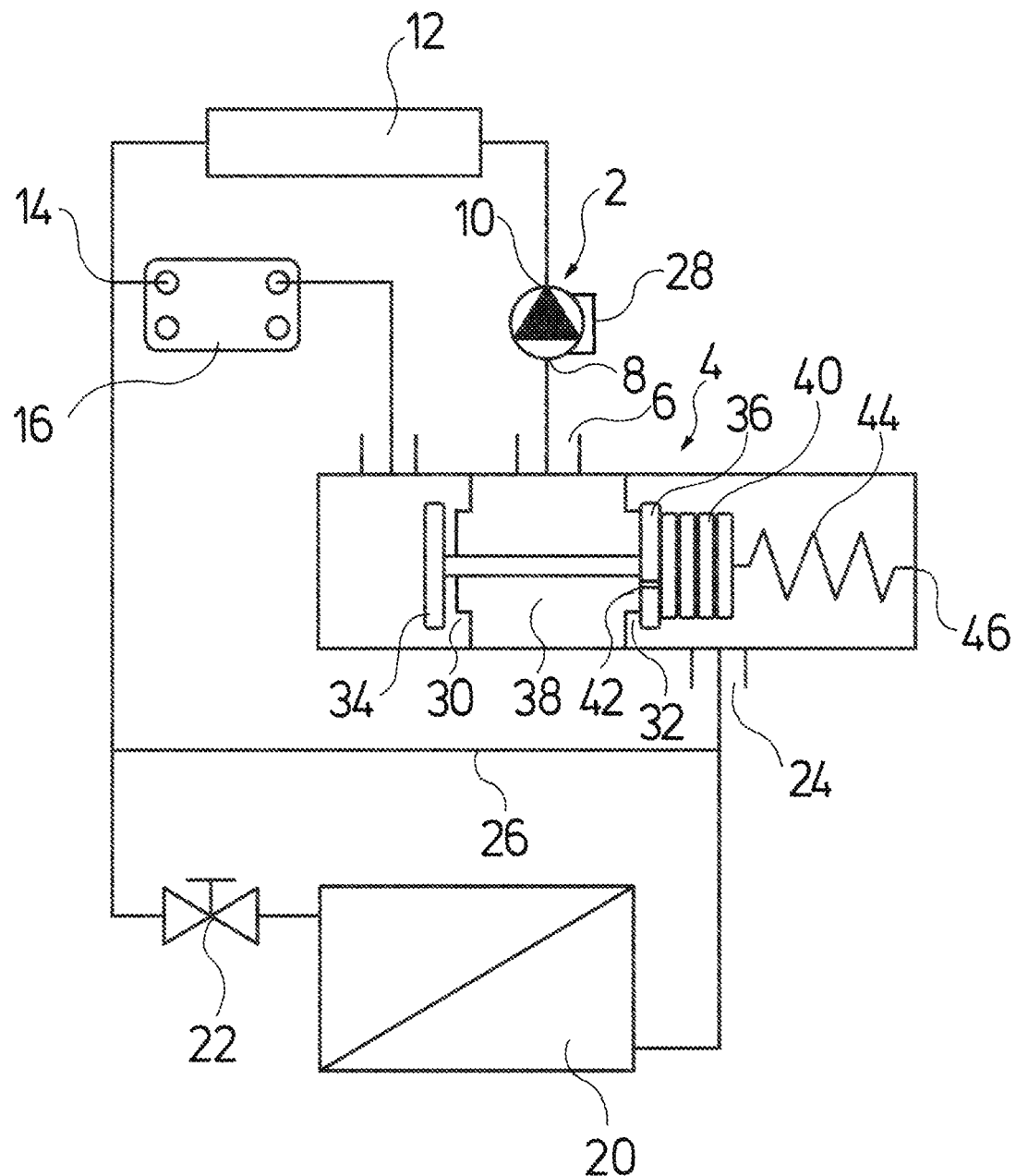
FIG. 2 is a schematic view showing the hydraulic system according to FIG. 1, in a first switch position of the switching device.

FIG. 1 shows the first switch position of the switching device 4 or the switching elements (valve elements 34 and 36). In this switch position, the valve seat 32 is closed by the valve element 36 and the flow path through the heating circuit is thus closed. If the pump assembly 2 delivers, it thus delivers liquid, which is to say water in particular, in the circuit through the primary heat exchanger 12 and the secondary heat exchanger 16. The pressure is transmitted from the node point 14 through the closed circuit 20 and, as the case may be, through the bypass 26 to the second entry 24 of the switching device 4, due to the fact that the valve is closed on the valve seat 32. There, at the second entry, this pressure acts upon the face side of the bellows 40. The pressure prevailing in the connection space 38 simultaneously acts in the inside of the bellows via the through-hole 32. This pressure essentially corresponds to the pressure at the suction-side connection 8 of the pump assembly 2. Thus a pressure difference exists at the face side of the bellows 40 and this with the operation of the pump assembly 2 in this condition leads to the bellows 40 being compressed and the tension spring 44 being lengthened, as is shown in FIG. 2. This is the condition which serves for heating the service water and in which the heating medium is delivered through the secondary heat exchanger 16. This condition is automatically held as long as the pressure prevailing at the second entry 24 is greater than the force of the spring 44.

This is the case as long as the pump assembly 2 is situated in a first operating condition, in which the speed lies above a predefined limit speed. The predefined limit speed is stored in the control device 28 and is set such that the pressure at the second entry 24 is so high that the force which acts upon the bellows 40 and the valve element 36 and which is produced by this pressure is larger than the tension force which is exerted by the spring 44.

Figure 3:
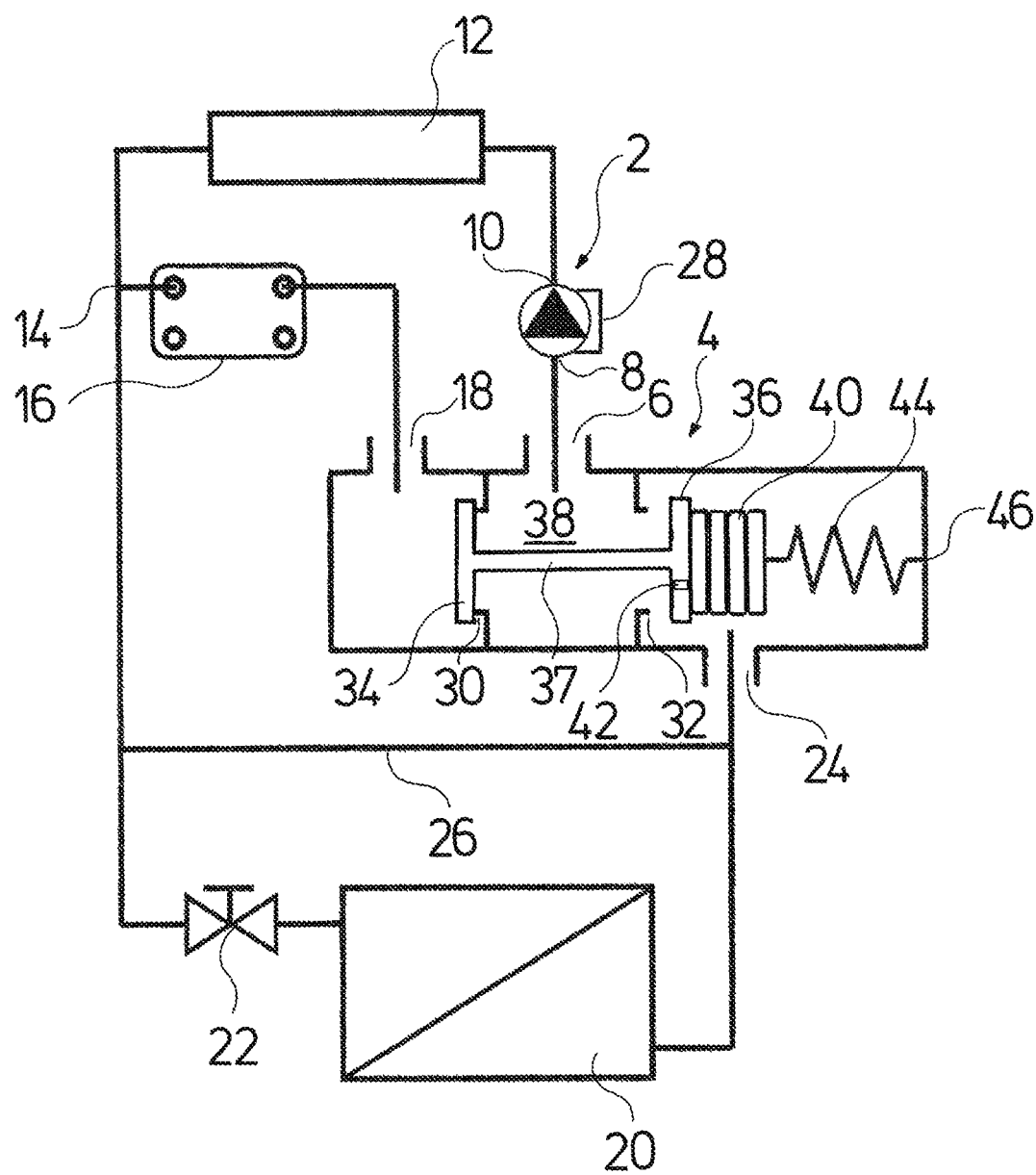
FIG. 3 is a schematic view showing the hydraulic system according to FIGS. 1 and 2, in a second switch position of the switching device.
Figure 4:
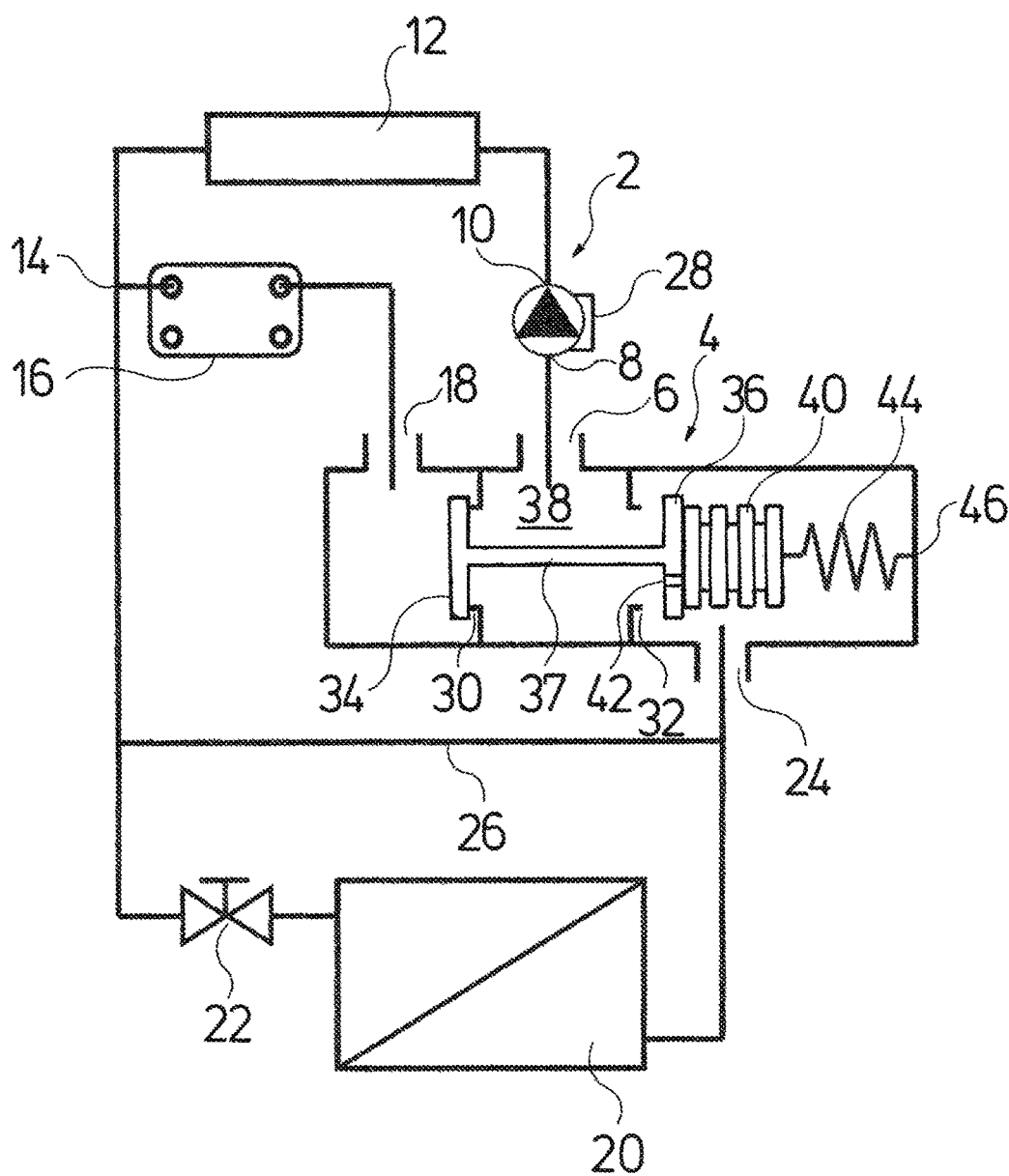
FIG. 4 is a schematic view showing the hydraulic system according to FIG. 3 in the second switch position in a further operation.
Figure 5:
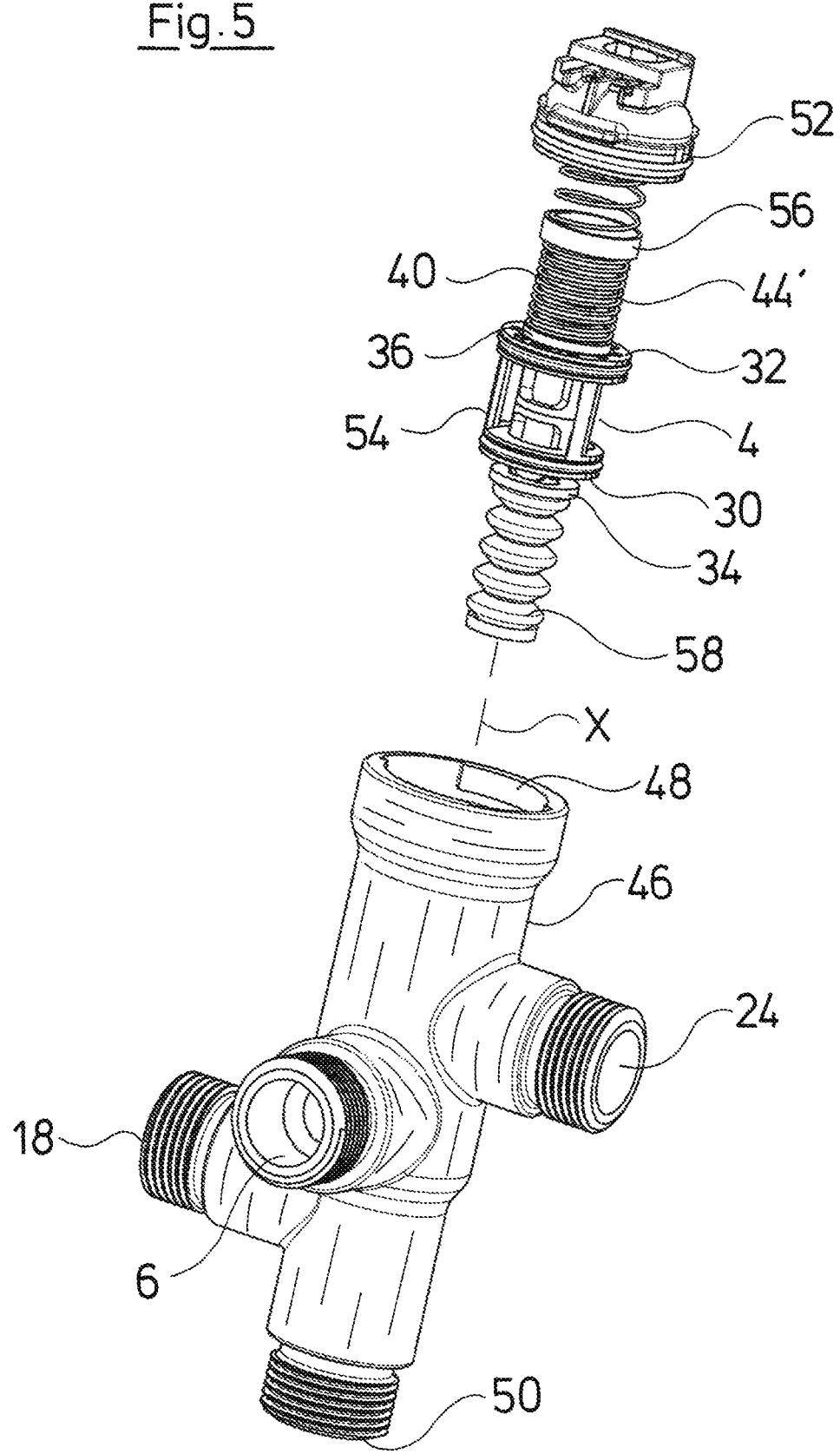
FIG. 5 is an exploded perspective view of a switching device for a hydraulic system according to the invention, and according to a first embodiment.

The pump assembly 2 is brought into a second operating condition by way of the control device 28, in which second operating condition the speed lies below the predefined limit speed, in order to move the valve or the switching device 4 into its second switch position, in which the valve seat 30 is closed and the second valve seat 32 is opened. In this condition, the pressure at the second entry 24 drops to such an extent that the force which is directed by the pressure on the bellows 40 toward the valve seat 32 is smaller than the tension force exerted by the spring 44. This leads to the spring 44 contracting as is shown in FIG. 3, and lifting the bellows 40 with the valve element 36 fastened thereon, from the valve seat 32. Thereby, the valve element 34 is simultaneously brought into sealing contact on the valve seat 30 due to the coupling of the valve elements 36 and 34. The bellows 40 does not relax in a direct manner with this movement, since its interior can only be filled via the through-hole 42 acting as a throttle. The bellows 40 is thus firstly co-moved in the essentially pressed-together condition. Only later does the bellows 40 slowly unfold again into a condition, as is shown in FIG. 4. If the pump assembly 2 is again brought into the first operating condition by way of its control device 28 before this unfolding of the bellows 40, the speed of the pump assembly 2 increases again and with this again the pressure at the node point 14, said pressure is now transmitted via the secondary heat exchanger 16 to the first entry 18 and thus onto the surface of the valve element 34. A force holding the valve element 34 in a closed condition pressed against the valve seat 30 thus acts upon the valve element 34. A stable condition is again achieved. The switching device 4 is thus configured in such a bistable manner that it is automatically held in each of the two described switch positions on operation of the pump assembly 2 with an adequately high speed. An external drive or an external holding force is not necessary for this.

The described switching-over is likewise effected without an external drive, but solely via a hydraulic coupling of the pump assembly 2 to the switching device 4 via the hydraulic system itself. The spring 44 serves as an energy store which receives energy on operating in the first operating condition and then releases it again due to relaxation on switching into the second operating condition. Thus, a force for moving the valve element is produced by the spring 44. The energy or switching energy which is required for this is previously taken by the spring 44 from the hydraulic system in the first operating condition.

The bellows 40 with the through-hole 42 which acts as a throttle serves for decoupling the spring 44 from the valve elements 34 and 36 during the charging procedure, with which the spring 44 absorbs energy. The bellows 40 thus specifically permits the spring 44 to be extended in a first operating condition, without having to move the valve elements 34 and 36. The valve elements 34 and 36 in contrast remain in the starting position shown in FIGS. 1 and 2. However, on switching into the second operating condition with a lower speed, a direct coupling between the spring 44 and the valve element 36 essentially exists due to the throttle location which is formed by the through-hole 42, so that the valve element 36 is moved directly by the spring 44.

What is essential is the fact that the control device 28 switches the pump assembly 2 from the second operating condition in an adequately rapid manner back into the first operating condition, before the bellows 40 can completely unfold, so that the switching device or the valve element 34 is held in the second switch position which is shown in FIG. 4, again by way of the hydraulic pressure. If the pump assembly 2 is switched off in this second switch position, the hydraulic pressure acting upon the valve element 34 then falls away, so that a pressure force against the bellows 40 no longer acts upon the valve element 34 and the valve element 36. The effect of this is that the bellows 40 can then unfold further into the condition which is shown in FIG. 1, on account of its elasticity. If the spring 44 is completely compressed in this condition, then the bellows 40 which then acts as a spring presses the valve elements 34 and 36 back again into their initial position, which is to say the first switch position which is shown in FIG. 1. The system can be taken into operation again from this first switch position, by way of starting operation of the pump assembly 2. A further compression spring could be additionally provided in the inside or outside of the bellows 40 as a restoring element, additionally to the elasticity of the spring bellows 40.

What is essential to the system is the fact that the two operating conditions merely necessitate different speeds and thus different starting pressures of the circulation pump assembly 2, but not a rotation direction reversal of the pump assembly 2. This benefits the efficiency. Moreover, it is not necessary to completely switch off the pump assembly 2 for switching the two operating conditions However, it is also possible for the second operating condition to not only have a reduced speed, but for the pump assembly 2 to be completely stopped in the second operating condition. Even then, it only needs to be started in operation again sufficiently rapidly, in order to prevent a return movement of the valve elements 34 due to the expansion of the bellows 40 or, as the case may be, an additional spring.

The switching device 4 which is described here, as also the subsequently described embodiment examples of switching devices are envisaged to be arranged at the suction side of the pump assembly 2 in the described manner. However, it is to be understood that a suitably configured switching device can also be applied at the delivery side of the pump assembly 2. With the switching device represented in FIGS. 1 to 4, the valve elements 34 and 36 would then merely need to be arranged not on valves seats 30, 32 which are away from one another, but on valve seats which face one another, which is to say in the inside of the connection space 38, in order to achieve the desired self-holding function, as has been described.

Different embodiment examples of switching devices are now described hereinafter, and these can all be integrated into a hydraulic system such as the shown heating system, in the manner described by way of FIGS. 1 to 4. The remaining components which are not shown in the following examples, in particular the pump assembly 2 as well as the heat exchanger 12, 16 and 20, and their arrangement can correspond to this. The previous description is referred to inasmuch as this is concerned.

The subsequently described embodiment examples according to FIGS. 5 to 8 as well as 11 to 19 differ in the manner of the construction of the switching device. Common to these switching devices is a housing 46, in which the actual switching device 4 is arranged as a cartridge. This permits a simple assembly also in complex conduit systems, as for example exist with integrated construction units for compact heating installations, so-called heating blocks. The housing 46 comprises an insert opening 48 at a longitudinal end, as well as a further assembly opening 50 at the opposite longitudinal end. The insert opening 48 is closed by a closure 52, and the assembly opening 50 is closed by a threaded plug which is not represented here, for operation. The exit 6 as well as the first entry 18 and the second entry 24 are formed on the housing as connection pieces (branches). Single-piece connections or connections formed in a different manner, to further components of the hydraulic system can also be provided instead of these connection pieces, in particular if the housing 46 is part of an integrated construction unit for a heating installation. As also in the embodiment example according to FIGS. 1 to 4, the entries 18 and 24 as well as the exit 6 are offset in the axial direction X, wherein the exit 6 lies between the entries 18 and 24.

The switching device 4 which is represented in FIGS. 5 to 8 functions in a manner as was described by way of FIGS. 1 to 4. A connection space 38 is provided in the inside of the housing 46 in a manner adjacent to the exit 6, and this connection space comprises two valve seats 30 and 32 which are away from one another. As is to be recognized in FIG. 5, the valve seats 30 and 32 are formed on a central carrier element 54 which is sealingly inserted into the receiving space 38. A first valve element 34 faces the valve seat 30, and a second valve element 36 faces the valve seat 32. The valve elements 34 and 36 are the switching elements of the switching device and are connected to one another via a connection element 37. In the example shown here, the connection element 37 is formed by extensions of the valve elements 34 and 36 which are screwed to one another. A different type of connection or a single-piece construction of the valve elements 34 and 36 is also possible.

A bellows 40 bears on the valve element 34, as is described by way of FIGS. 1 to 4. This bellows at its axial end which is away from the valve element 36 is closed by a disc 56 serving as a pressure surface. The pressure prevailing at the second entry 24 acts upon the disc 56, as was described beforehand, and thus produces a pressing force which is directed in the axial direction X towards the valve seat 32. A spring 44' is arranged surrounding the bellows 40 and is supported with a first axial end on the valve element 36 and on the opposite axial end in the closure 52 and is thus fixed on the housing 46. The disc 56 is fastened in the spring 44', so that it divides the spring into two sections, a first section which is situated between the disc 56 and the closure 52, and a second section which is situated between the disc 56 and the valve element 36. The first section of the spring 44' thereby has the function of the spring 44 which has been described by way of FIGS. 1 to 4, and as a whole the spring 44' in the two sections acts as a tension spring as well as a compression spring, as is described hereinafter.

A through-hole 42' is formed in the connection element 37 and this, as is the case with the through-hole 42, acts as a throttle and connects the interior of the bellows 40 to the interior of the second bellows 58, said second bellows being arranged on the valve element 34 at its side which is away from the valve seat 30. Thus a closed system which can be filled with a fluid, in particular water, is therefore created in the inside of the bellows 40 and 58. No fluid exchange thereby occurs with the surrounding fluid in the hydraulic system, so that a contamination of the throttle location formed by the through-hole 42 can be prevented.

Figure 6:
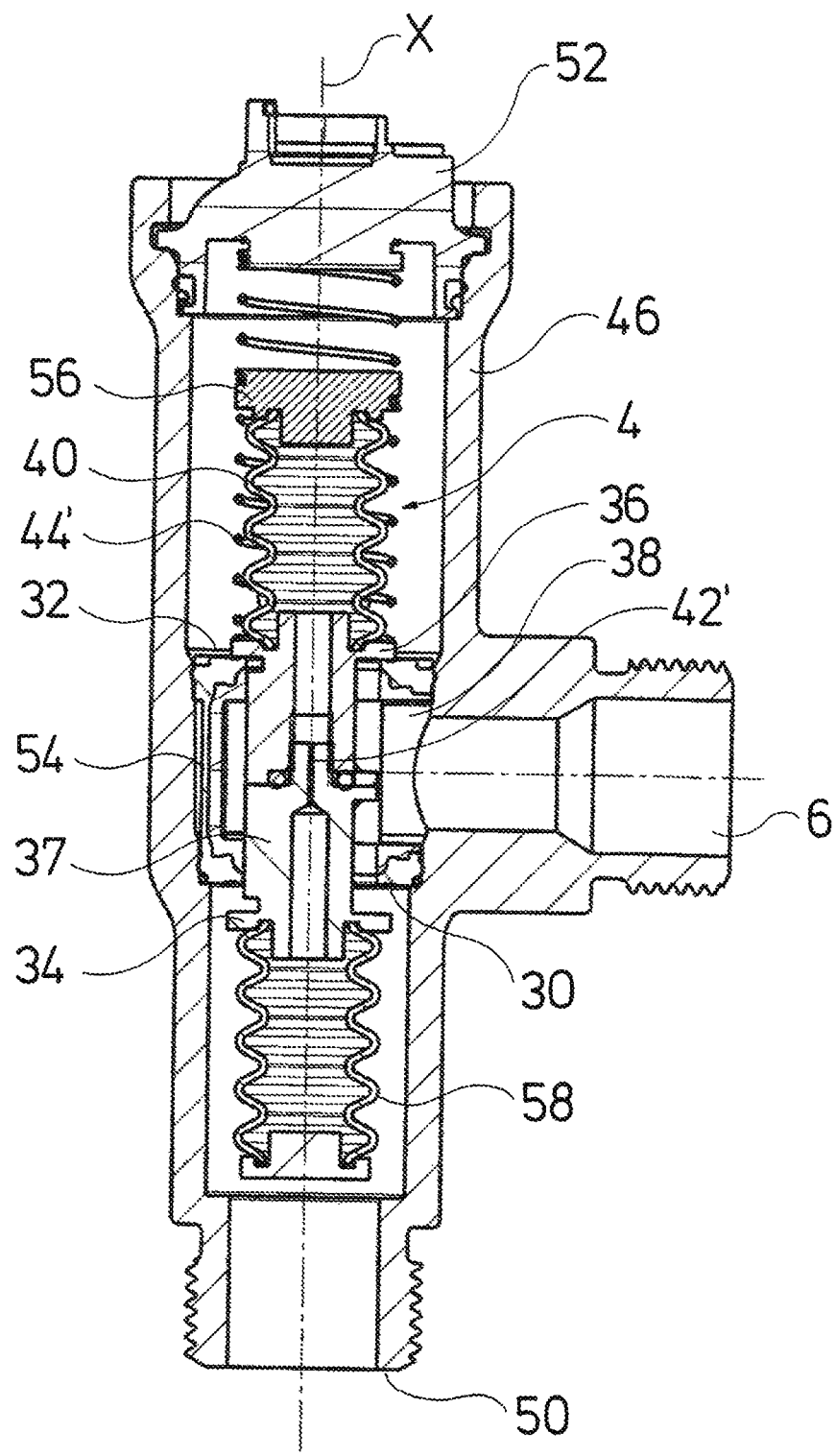
FIG. 6 is a sectional view of the switching device according to FIG. 5, in an idle condition.
Figure 7:
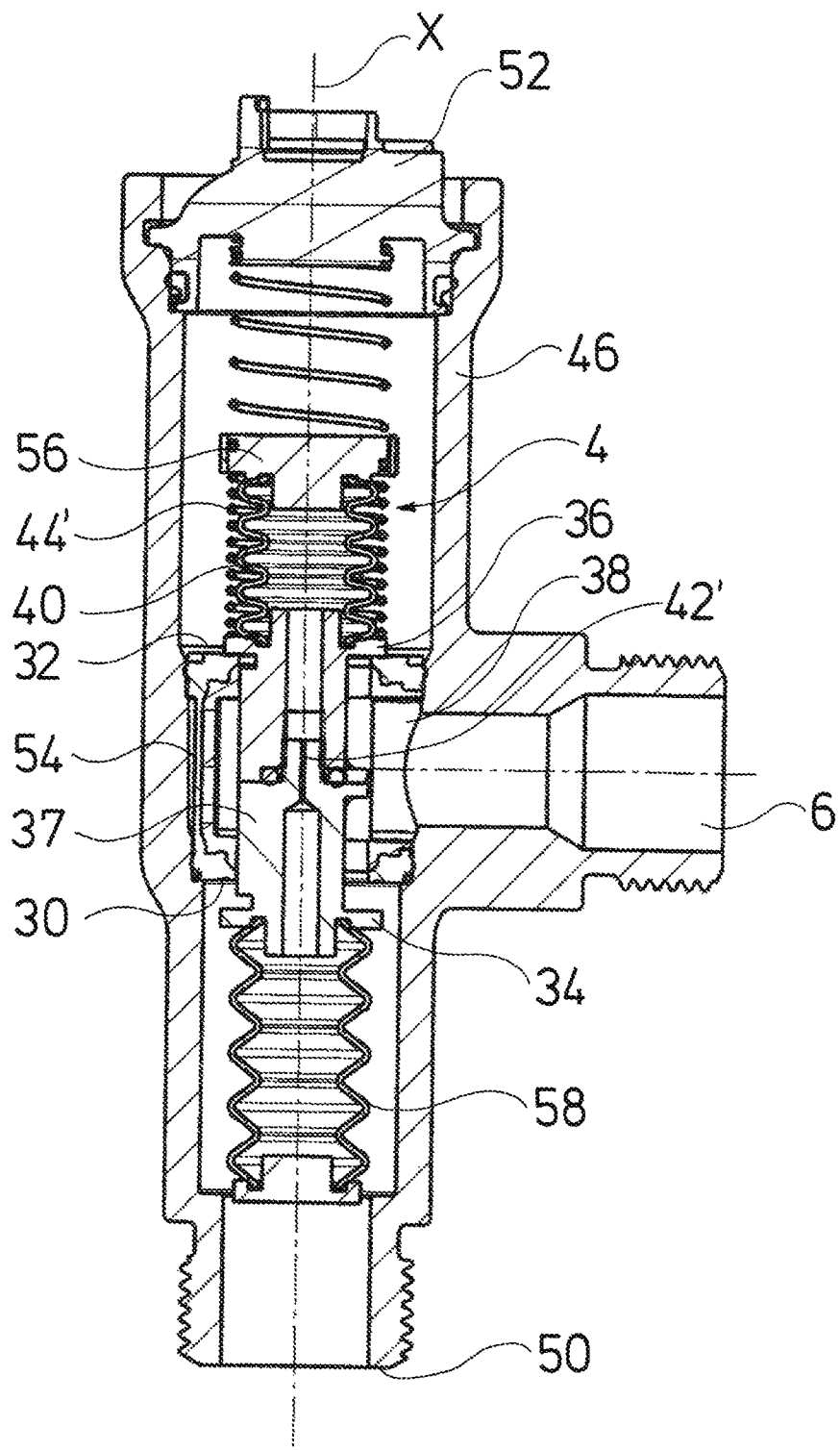
FIG. 7 is a sectional view according to FIG. 6, in which the switching device is situated in a first switch position.

FIG. 6 shows the idle position of the switching device 4, in which the switching device or its valve element 34 and 36 are situated in their first switch position, in which the valve element 36 bears on the valve seat 32 and the valve element 34 is distanced to the valve seat 30. Thus, according to the representation in FIG. 1, a first flow path, in particular through a secondary heat exchanger 16 is opened, when the switching device is applied in a corresponding manner as shown in FIGS. 1-4. The spring 44' in this position in its entirety acts as a compression spring and presses the valve element 36 against the valve seat 32. If in this condition, the pump assembly 2 is set into operation in its first operating condition with a speed above its first limit speed, then a pressure producing a pressure force on the disc 56 in the longitudinal axis X to the valve seat 32 is produced at the second entry 24 in the manner described above. Thereby, the disc 56 is moved against the pressing force of the second section of the spring 44' since a lower pressure prevails at the first entry 18, wherein the bellows 40 is compressed. The fluid in the inside of the bellows 40 is thereby brought through the through-hole 42' into the inside of the second bellows 58. The first section of the spring 44' is simultaneously lengthened by way of the movement of the disc 56 away from the closure 52, so that this section is stretched as a tension spring. Energy or switching energy is stored in the spring in this operational condition in this manner.

Figure 8:
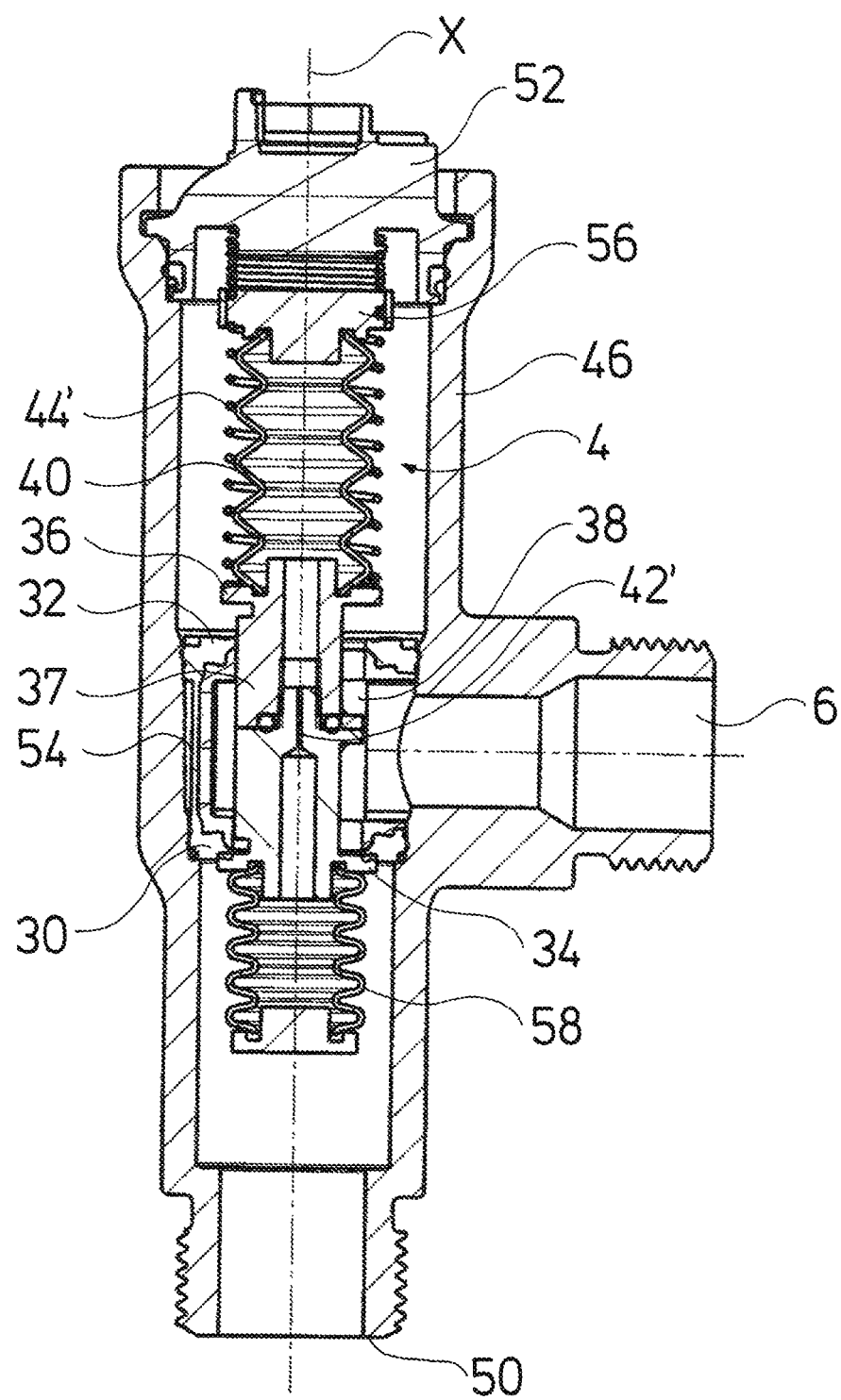
FIG. 8 is a sectional view according to FIGS. 6 and 7, wherein the switching device is situated in a second switch position.

If the pump assembly 2 is now switched by its control device 28 into the second operating condition with a lower speed, then the pressure acting upon the disc 56 reduces so that the force acting upon the disc 56 in the axial direction X is no longer in equilibrium with the spring force of the extended first section of the spring 44'. This first section of the spring thus pulls the disc 56 away from the valve seat 32. Since the bellows 40 is not filled again straightaway due to the throttle effect of the through-hole 42, the compressed bellows thereby together with the valve element 36 is moved away from the valve seat 32 and the valve is thus opened. The valve element 34 simultaneously comes into sealed contact on the valve seat 30. If the pump assembly 2 is now set into the first operational condition with a higher speed before the bellows 40 unfolds again, the greater pressure then acts at the first closure 18 and thus produces a force which acts towards the valve seat 20 in the axial direction X, upon the face side of the bellows 58 and thus upon the valve element 34. This force holds the valve element 34 with a sealed contact on the valve seat 30. Thus, a self-holding condition of the valve is achieved on operation of the hydraulic system. The second bellows 58 now empties via the through-hole 42' due to the pressure force, so that the first bellows 40 is expanded again and reaches the condition which is represented in FIG. 8. In this condition, the first section of the spring 44' which previously acted as a tension spring is compressed, so that this section now acts as a compression spring. If the pump assembly is switched off out of this condition, then the pressure upon the face side of the second bellows 56 falls away and the first section of the spring 44' between the disc 56 and the closure 52 acts as a restoring element and produces such a pressing force, that the bellows 40 together with the valve element 36 is moved again against the valve seat 32, so that the starting position shown in FIG. 6 is reached. Again, fluid is simultaneously relocated out of the bellow 40 into the bellows 58, since the second section of the spring 44' likewise relaxes which is to say contracts.

Figure 9:
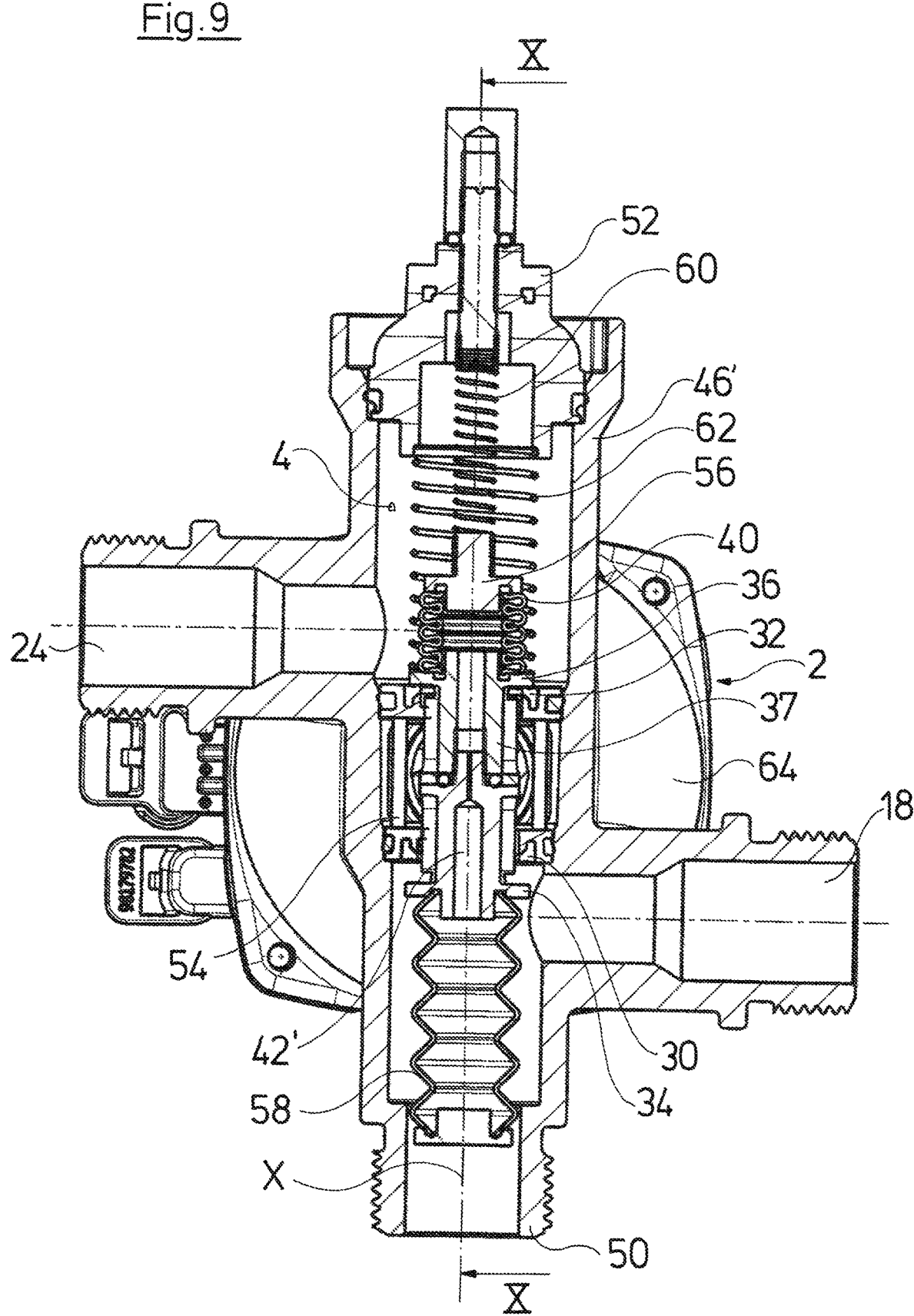
FIG. 9 is a sectional view of a switching device according to a second embodiment of the invention.
Figure 10:
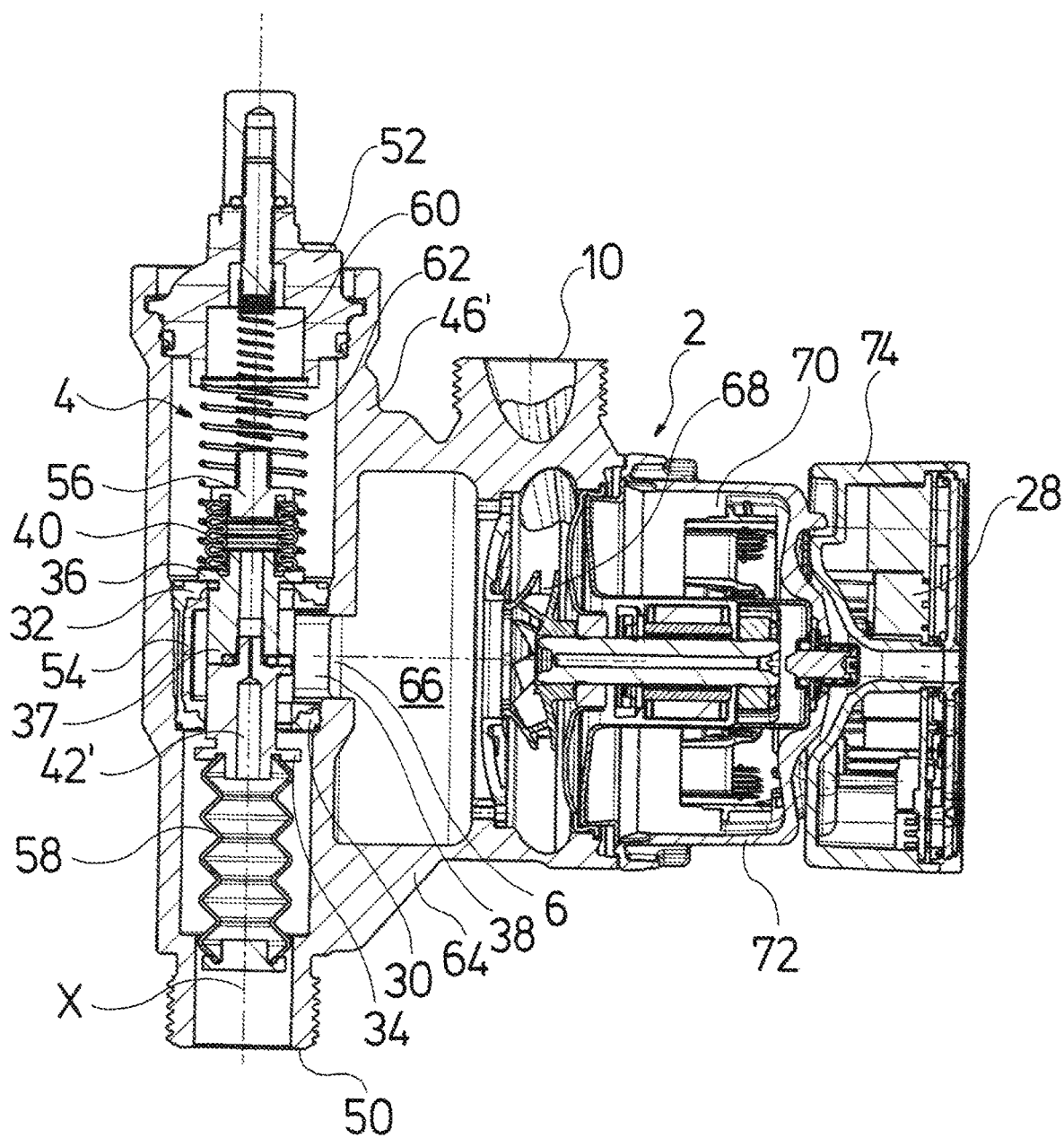
FIG. 10 is a sectional view through the switching device as well as an adjacent pump assembly along the lines X-X in FIG. 9.

The embodiment example in FIGS. 9 and 10 shows a further embodiment of the switching device according to the invention, and this corresponds essentially to the switching device which is explained by way of FIGS. 5 to 8. Only the arrangement of the springs is different. With the embodiment example according to FIGS. 9 and 10, two springs 60 and 62 are provided instead of one spring 44', and specifically a tension spring 60 and a compression spring 62. The compression spring 62 is supported directly between the closure 52 and the valve element 36, whereas the tension spring 60 connects the disc 56 to the closure 52. The FIGS. 9 and 10 show the first switch position which corresponds to FIG. 7, which is to say during which the pump assembly is situated in the first operating condition and the bellows 40 is compressed by the pressure at the second entry 24. The spring 60 acts as a tension spring which, when the bellows 40 is compressed, is extended and functions as energy store. If the pump assembly 2 is switched into the second operating condition with a reduced speed and the holding force which acts upon the valve element 36 dwindles, then the tension spring 60 pulls the arrangement consisting of the disc 56, the compressed bellows 40 and the valve element 36, in the direction of the closure 52, which is to say away from the valve seat 32 in the axial direction X. Thereby, the valve element 34 is simultaneously brought to bear on the valve seat 30. The compression spring 62 which functions as a restoring element, is simultaneously compressed with this movement. On switching off the pump, the compression spring 62 moves the valve element 36 again into the starting position, in which the valve element 36 bears on the valve seat 32. The tension spring 60 must muster a greater force than the compression spring 62, since the tension spring 60 must overcome the spring force produced by the compression spring 62, in order to switch over the valve in the described manner.

In contrast to the embodiment described by way of FIGS. 5 to 8, with the embodiment example according to FIGS. 9 and 10, the housing 46' of the switching device 4 is configured in an integral manner with the pump casing 64 of the pump assembly 2. Here, the pump casing 64 and the housing 46' are configured in a single-piece manner. The exit 6 of the switching device 4 runs out directly into the suction chamber 66 of the pump casing. An impeller 68 which is driven via an electric drive motor 70 configured as a canned motor is arranged in the pump casing. The drive motor 70 is arranged in a motor or stator casing 72 which is connected to the pump casing 64. A terminal box or electronics housing 74, in which the control device 28 is arranged, is applied onto the motor casing 72 at the axial side. A construction unit consisting of the pump assembly, the control device 28 and the switching device 4 is thus created, and this as such can be integrated into a hydraulic system in a simple manner. It is to be understood that the previously described and subsequently described examples of switching devices can be integrated with the pump assembly 2 into a construction unit in the same manner, as is represented in FIGS. 9 and 10. The further embodiment examples are described by way of a separate housing 46 for simplification.

Figure 11:
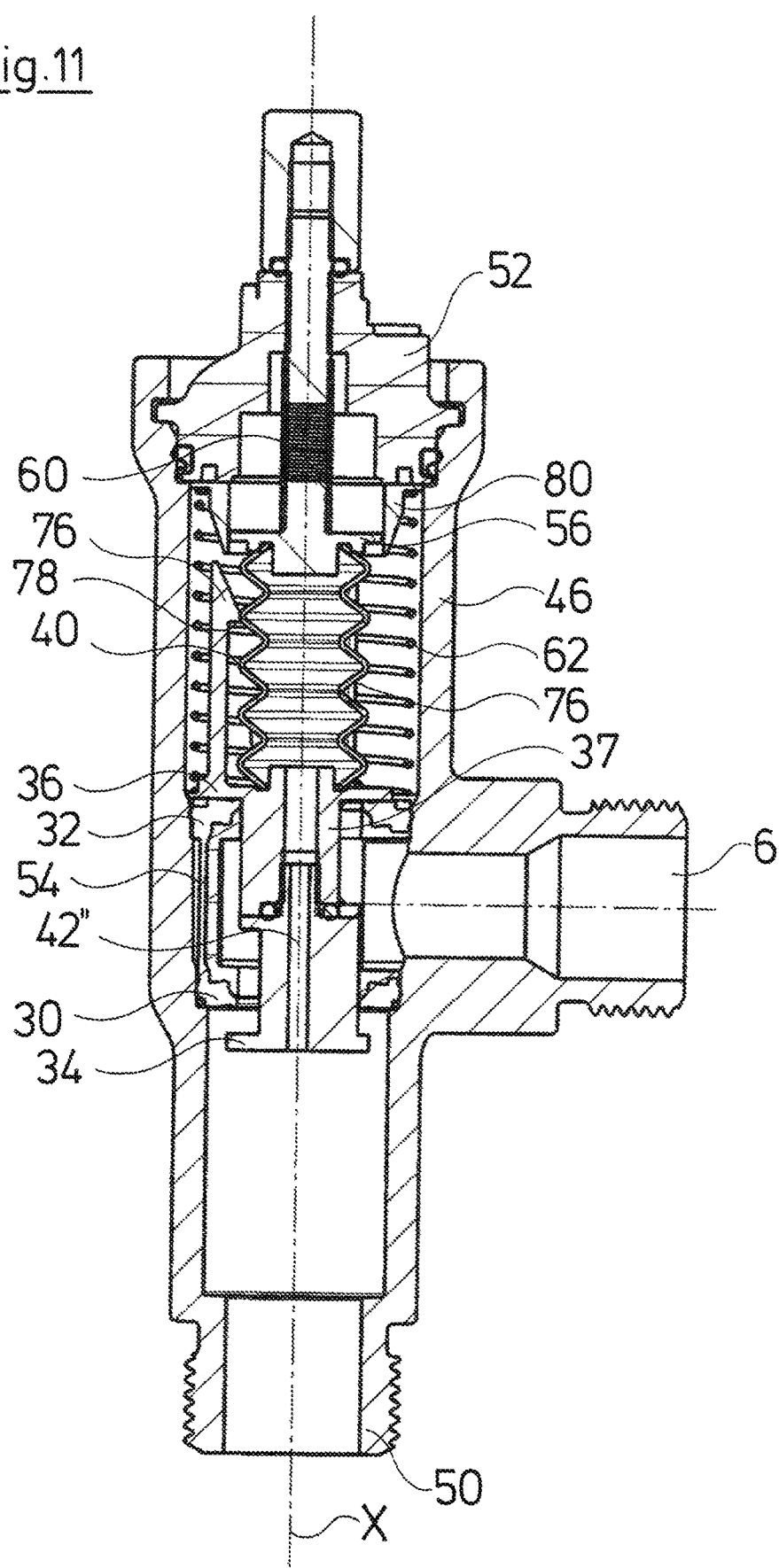
FIG. 11 is a sectional view of a switching device according to a third embodiment, wherein the switching device is situated in an idle position.
Figure 12:
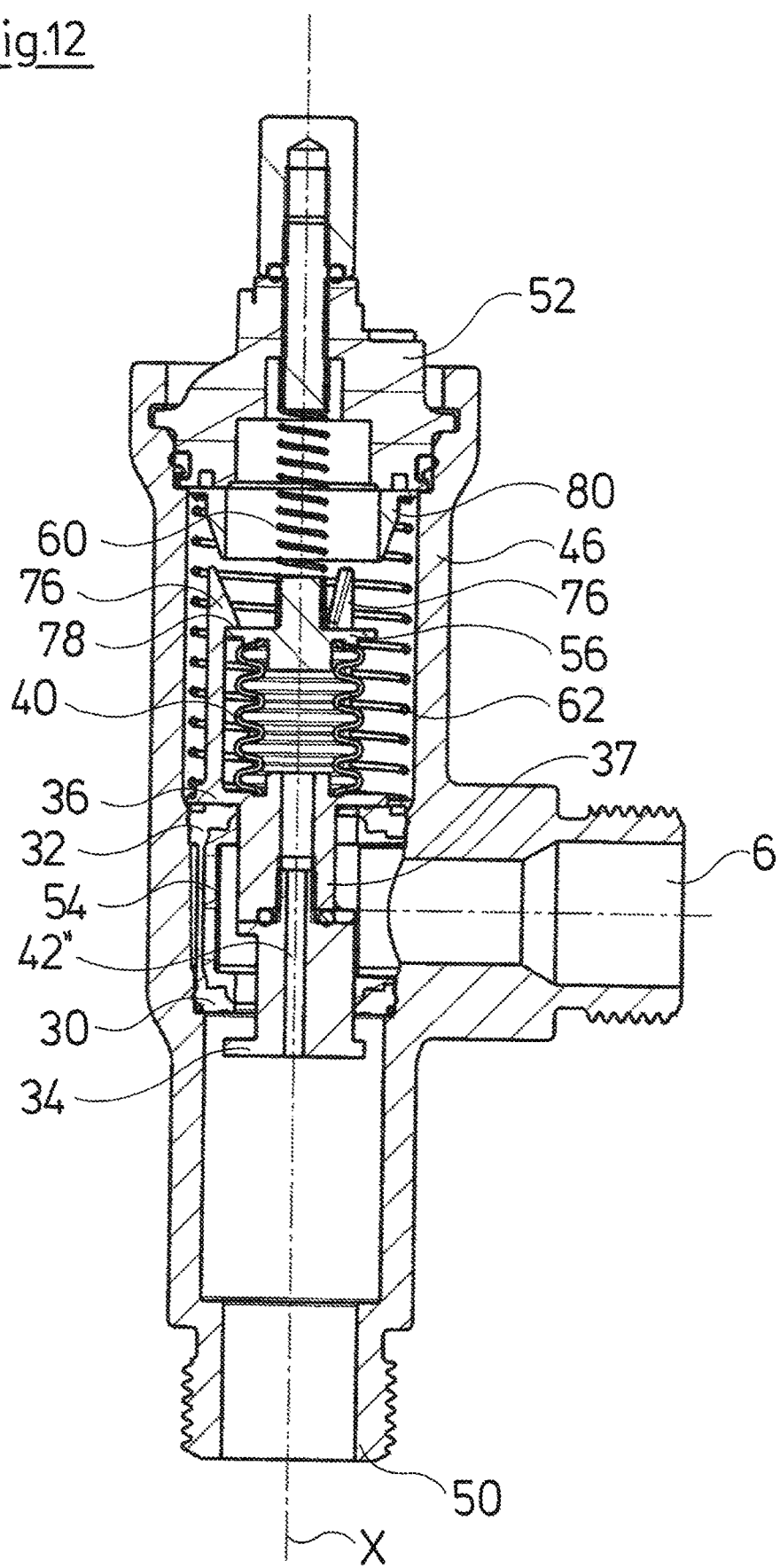
FIG. 12 is a sectional view according to FIG. 11, wherein the switching device is situated in a first switch position.
Figure 13:
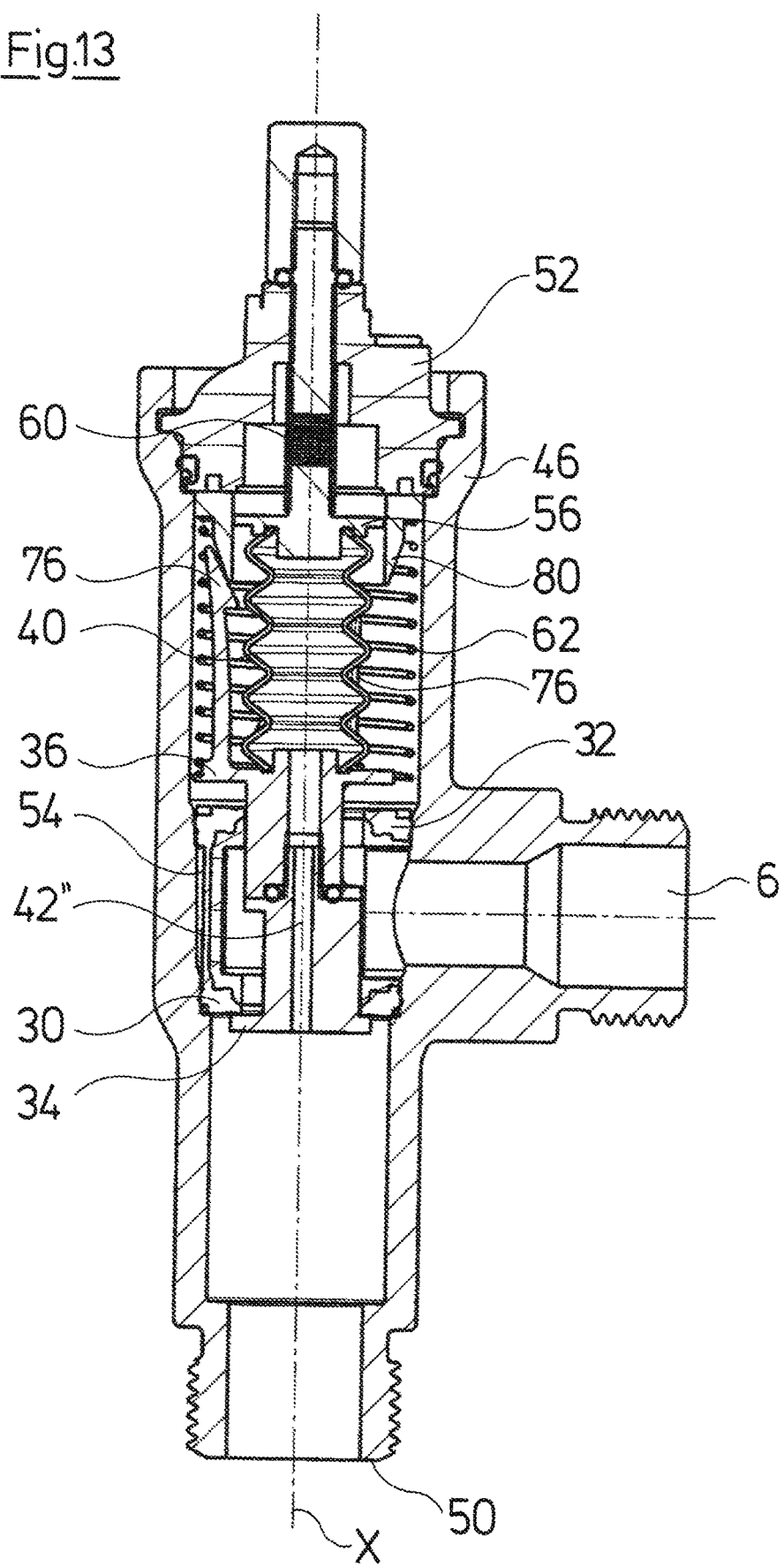
FIG. 13 is a sectional view according to FIGS. 11 and 12, wherein the switching device is situated in a second switch position.

The embodiment which is shown in FIGS. 11 to 13 differs from the preceding embodiments in that the decoupling of the charging procedure from the movement of the valve element 36 and the coupling of the movement of the valve element 36 to the discharging procedure of the energy store is not effected via a through-hole 42, 42' which acts as a throttle location, but via a mechanical locking as is described hereinafter. The through-hole 42" which is represented in FIGS. 11 and 13 between the valve elements 34 and 36 essentially does not act as a throttle location. As with the embodiment according to FIGS. 9 and 10, a tension spring 60 which is fastened on the closure 52 engages on the disc 56 closing the bellows 40 at the axial end. A compression spring 62 is also provided with this embodiment, and this spring with one axial end is supported on the closure 52 and with the opposite axial end bears on the valve element 36. The compression spring 62 in the starting or idle position which is shown in FIG. 11 presses the valve element 36 against the valve seat 32, so that the valve element 34 is simultaneously lifted from the valve element 30. The tension spring 60 is completely contracted in this condition. If now the pump assembly 2 is switched on in this condition by the control device 28 and is operated at a high speed in the first operating condition, then a pressure force which displaces the disc 56 in the axial direction X towards the valve seat 32 acts upon the disc 56 in the previously described manner due to the hydraulic pressure which prevails at the second entry 24. The bellows 40 is thereby compressed and the fluid in the inside of the bellows 40 is pressed through the through-hole 32' through the valve element 34 into the surrounding hydraulic system. This means that no closed system is envisaged inside the bellows 40. The disc 56 thereby passes detent (locking) hooks 76 which, departing from the valve element 36 extend parallel to the axial direction X. The detent hooks 76 are configured as resilient tongues and are fixedly connected to the valve element 36, preferably configured as one piece with this. The detent hooks 76 in each case are beveled at their free end facing the closure 52, such that they radially widen on passing the disc 56. They spring back radially inwards after passing the disk 56 and hold the disc 56 on the contact shoulders 78.

If now the pump assembly is switched into the second operating condition with a lower speed, then the pressure force upon the disc 56 reduces, so that the spring force which is produced by the tensioned tension spring 60 exceeds this pressure force. The switching energy which is stored in the tension spring 60 thus discharges and the tension spring 60 pulls the disc 56 towards the closure 52 in the axial direction. Thereby, since the disc 56 bears on the contact shoulders 78 of the detent hooks 76, the valve element 36 connected to the detent hooks 76 is co-moved and is lifted from the valve seat 32 in the axial direction X. The other valve element 34 is co-moved via the connection element 37 and is brought to bear on the valve seat 30 as is shown in FIG. 13. A ring element 80 which is conical at the outer periphery, is arranged on the closure 52 and departing from this extends in the axial direction enters between the detent hooks 76 when the valve element 36 is moved in the axial direction by a certain amount. The ring element 80 thus enters between the detent hooks 76 since these are pressed radially outwards, so that the contact shoulders 78 disengage from the disc 56. In this condition, the tension spring 60, as the case may be, assisted by elastic restoring forces of the bellows 40, can move the disc 56 further towards the closure 52 and thus relax the bellows 40, wherein the inside of the bellows 40 is filled with fluid from the hydraulic system again via the through-hole 42'. The pump assembly 2 is set back into the first operating condition in good time, before the disc 56 is released from the detent hooks 76 in the described manner, in order to again obtain a stable operating condition, in which the valve formed by the valve seat 30 and the valve element 34 is held in a closed manner. Again, in this first operating condition, such a high pressure is now produced at the first entry 18, that a pressing force which presses the valve element 34 onto the valve seat 30 against the pressing force produced by the compression spring 62 is produced by the pressure upon the valve element 34. If the pump assembly is switched off or is switched back into the second operating condition, then the pressing force which acts upon the valve element 34 reduces to such an extent, that the pressing force which is produced by the compression spring 62 becomes larger, so that the valve element 36 and the valve element 34 are then moved back again into the starting position which is shown in FIG. 11. With the embodiment example according to FIGS. 11 to 13, in contrast to the preceding embodiment examples, a delay of the relaxing of the bellows 40 is not realized via a throttle location but via the covered distance and the mechanical blockage which is formed by the detent hooks 76. However, with this embodiment too, one also succeeds in the spring 60 being able to absorb energy from the hydraulic system in a charging procedure, without having to significantly displace the valve elements 34 and 36. This absorbed energy can then be released again in a second operating condition of the pump assembly for displacing the valve elements 34 and 36.

The subsequently described embodiment examples according to FIGS. 14 to 19 differ from the previously described embodiment example by way of not providing a separate energy store, in particular no energy store in the form of a spring, in the switching device 4, but this switching device utilizing energy which is stored in the hydraulic system itself, in particular in the form of inertia energy of the circulating fluid.

Figure 14:
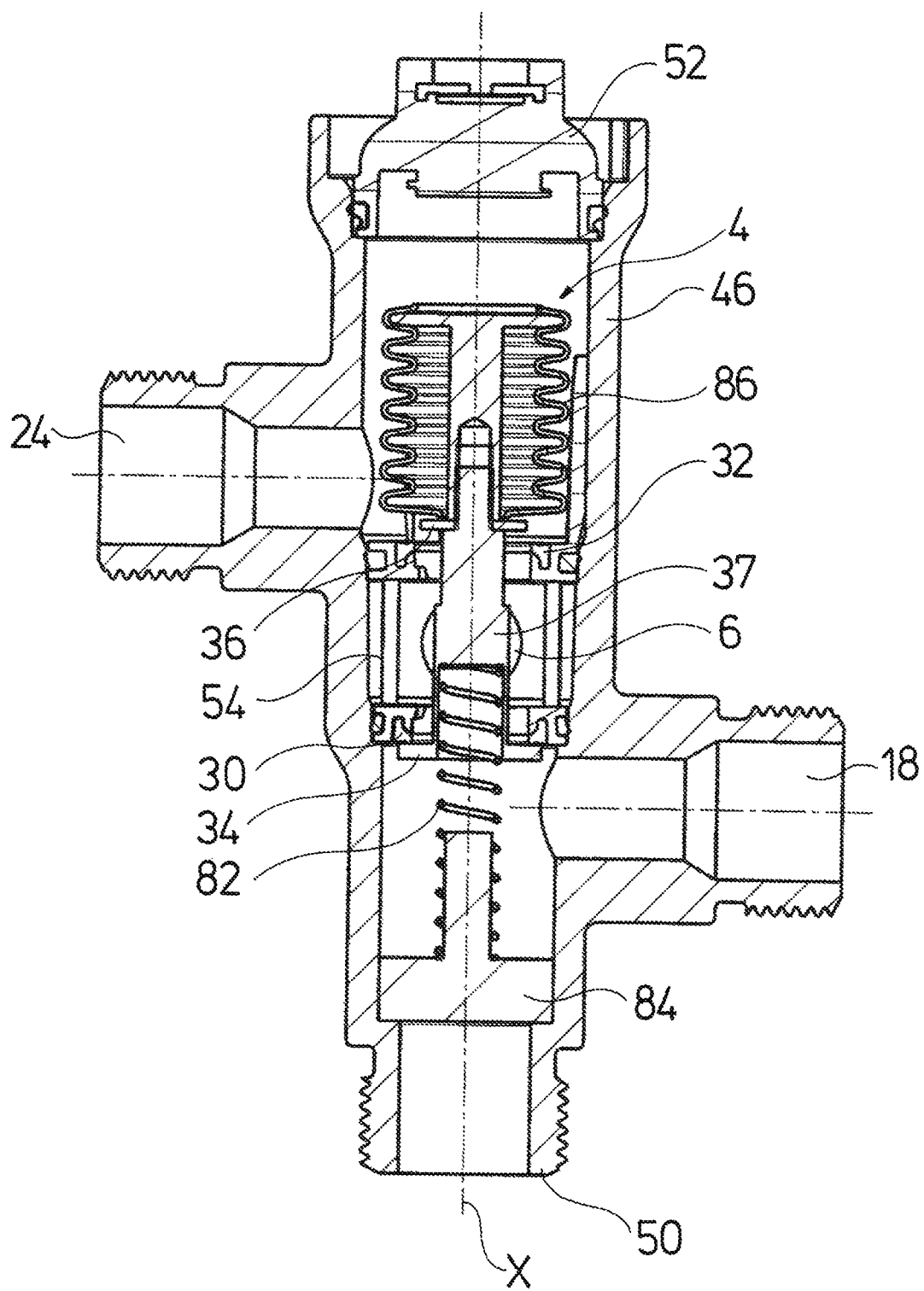
FIG. 14 is a sectional view of a switching device according to a fourth embodiment, wherein the switching device is situated in an idle position.
Figure 15:
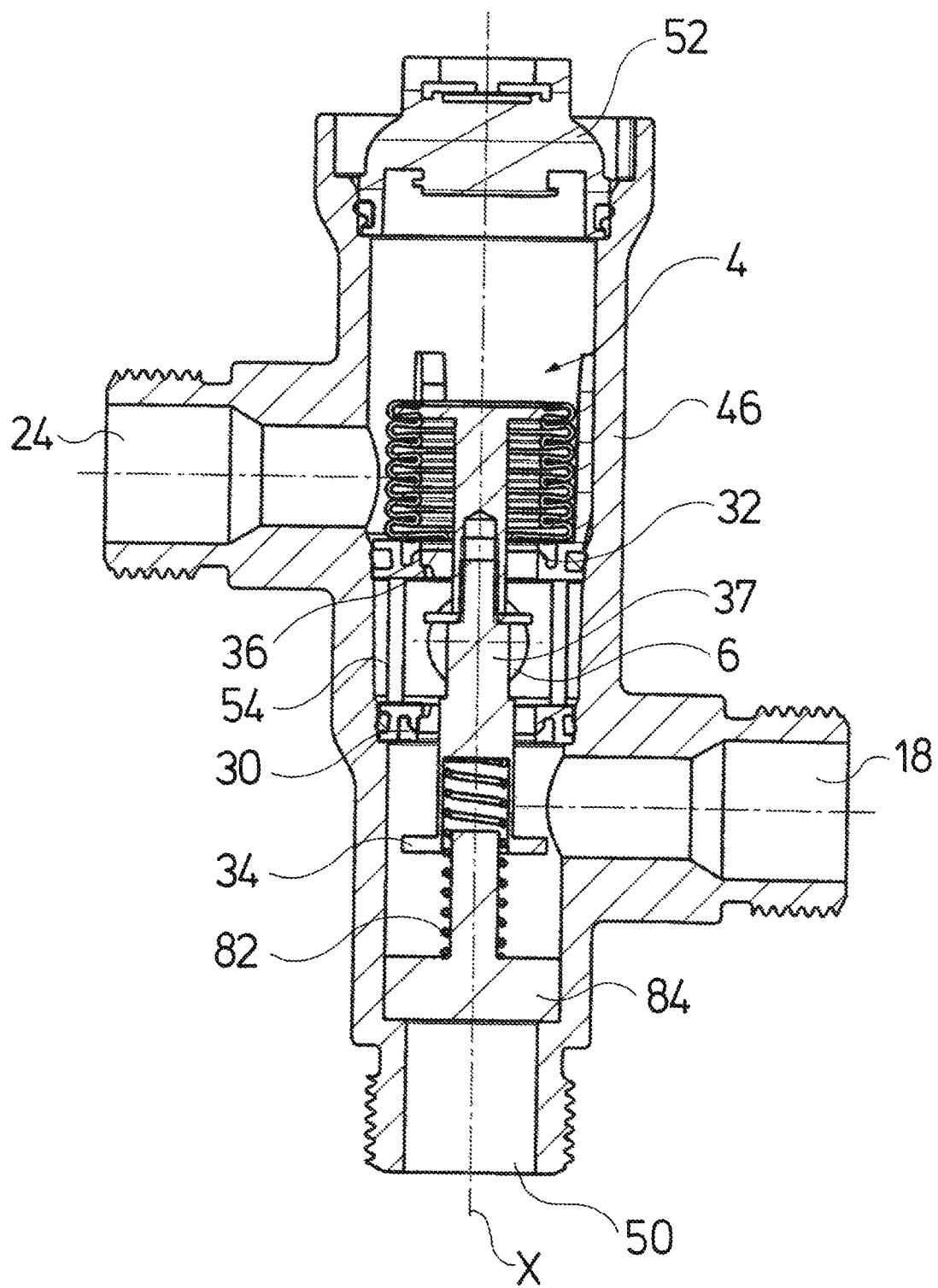
FIG. 15 is a sectional view according to FIG. 14, wherein the switching device is situated in a second switch position.

FIGS. 14 and 15 show a first embodiment example of a switching device 4 for such a system. FIG. 14 shows the starting position with a first switch position of the valve elements 34 and 36 which are connected to one another via the connection element 37. In this embodiment example too, the valve elements 34 and 36 can also alternately come to bear on the valve seats 30 and 32 which are configured and arranged essentially as described beforehand. The design of the housing 46 with the connection or the entries 18 and 24 as well as the exit 6 also corresponds to the previously described fashioning. The preceding embodiments are referred to inasmuch as this is concerned. With this embodiment example, the valve which is formed by the valve set 30 and the valve element 34 is closed, as is shown in FIG. 14, in the starting or idle position which corresponds to the first switch position. The idle position is held by a restoring spring 82. The restoring spring 82 is configured as a compression spring and is supported between the valve element 34 and a carrier 84 which bears on the assembly opening 50. The carrier 84 could also be configured as one piece with the housing 46. When the pump assembly 2 is set into operation in this condition, and one operates in the first operating condition with a high pressure, then the pressure at the node point 14 prevails at the entry 18 and presses against the valve element 34, so that this is held in contact on the valve seat 30. Thus a stable, self-holding condition is given on operation of the hydraulic system. Fluid simultaneously flows from the second entry 34 through the gap between the valve element 36 and the valve seat 32 to the exit 6. Thereby, the fluid or the flowing liquid has certain kinetic energy. If now the pump assembly 2 is switched into a second operating condition with a lower speed which lies below a limit speed, down to which the self-holding function is given, the force acting upon the valve element 34 by the pressure reduces so that the self-holding function is cancelled. Thereby, the pressure reduces more rapidly than the flow speed or the kinetic energy of the fluid which originates from the flow. This flow energy continues to act upon the valve element 36, so that this is then entrained by the flow and is brought into contact with the valve seat 32, whilst the valve element 34 is simultaneously lifted from the valve seat 30 via the connection element 37.

If the pump assembly is not completely switched off in this second operating condition, but continues to be operated with a reduced speed, then again the pressure at the node point 14 prevails straightaway at the second entry 24 and this pressure exerts a pressing force upon the valve element 36 and holds the valve element in contact with the valve seat 32.

Thus again a self-holding condition is reached straightaway and this continues to be held if the pump assembly is then again set into its first operating condition. Thus a switchover of the flow path between the entries 18 and 24 is hereby also possible without an additional drive, wherein energy which was previously stored in the system is utilized for moving the valve elements 34 and 36. A bellows (bag) 86 which connects the valve element 36 to the connection element 37 is additionally provided in this system. The bellows 86 serves as a damper and prevents the valve element 36 from moving back again straight away due to the impact energy, when it is pressed against the valve seat 32 by the flow. This impact energy can be absorbed by way of the bellows 86 springing in. This condition is shown in FIG. 15. If the pump assembly is switched off in this condition, then the hydraulic pressure exerting the holding force upon the valve element 36 is again cancelled, so that this holding force is overcome by the pressing force which the spring 82 exerts. The spring 82 then as a restoring element moves the valve elements 34 and 36 again into the starting position represented in FIG. 14.

Figure 16:
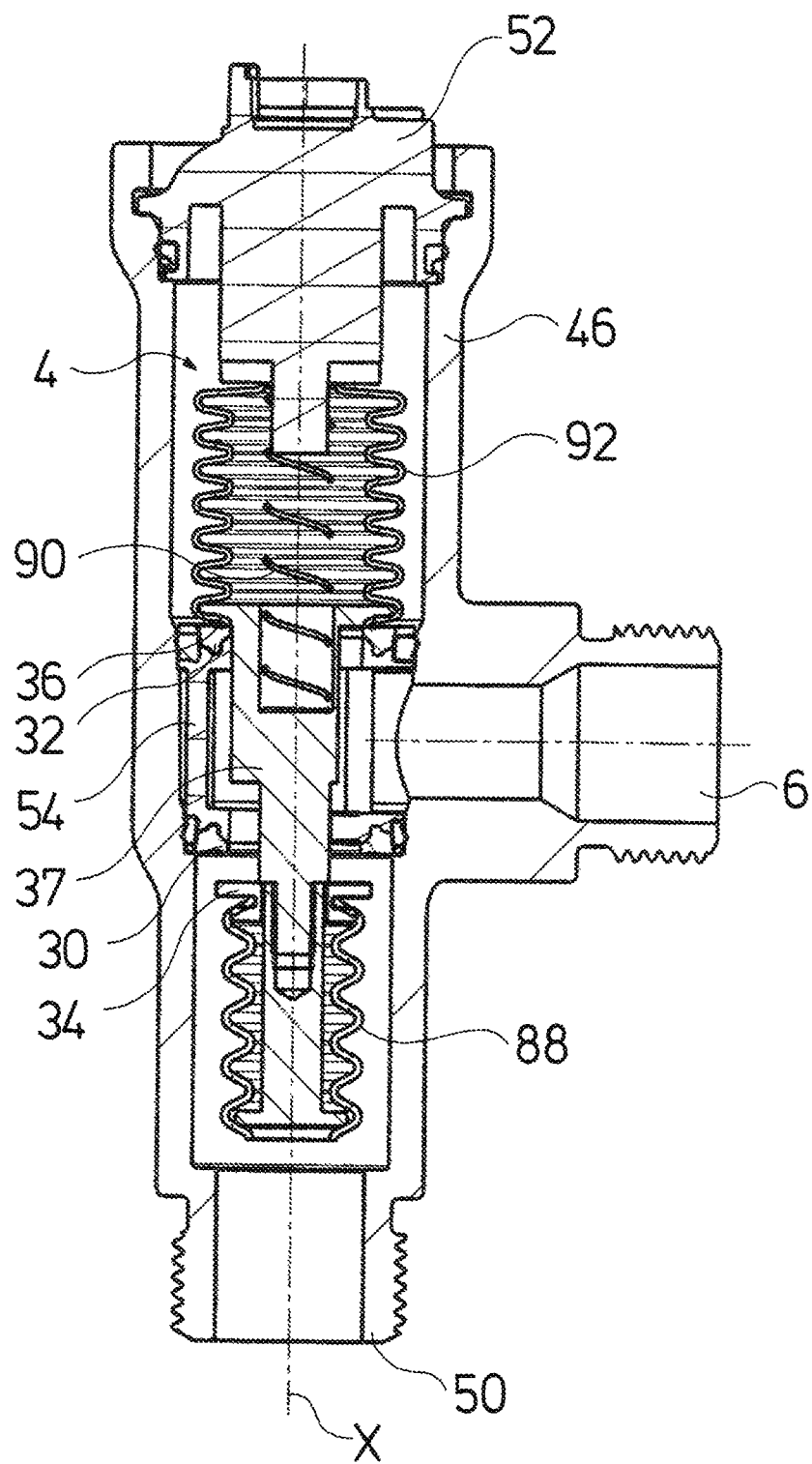
FIG. 16 is a sectional view of a switching device according to a sixth embodiment, wherein the switching device is situated in an idle position.
Figure 17:
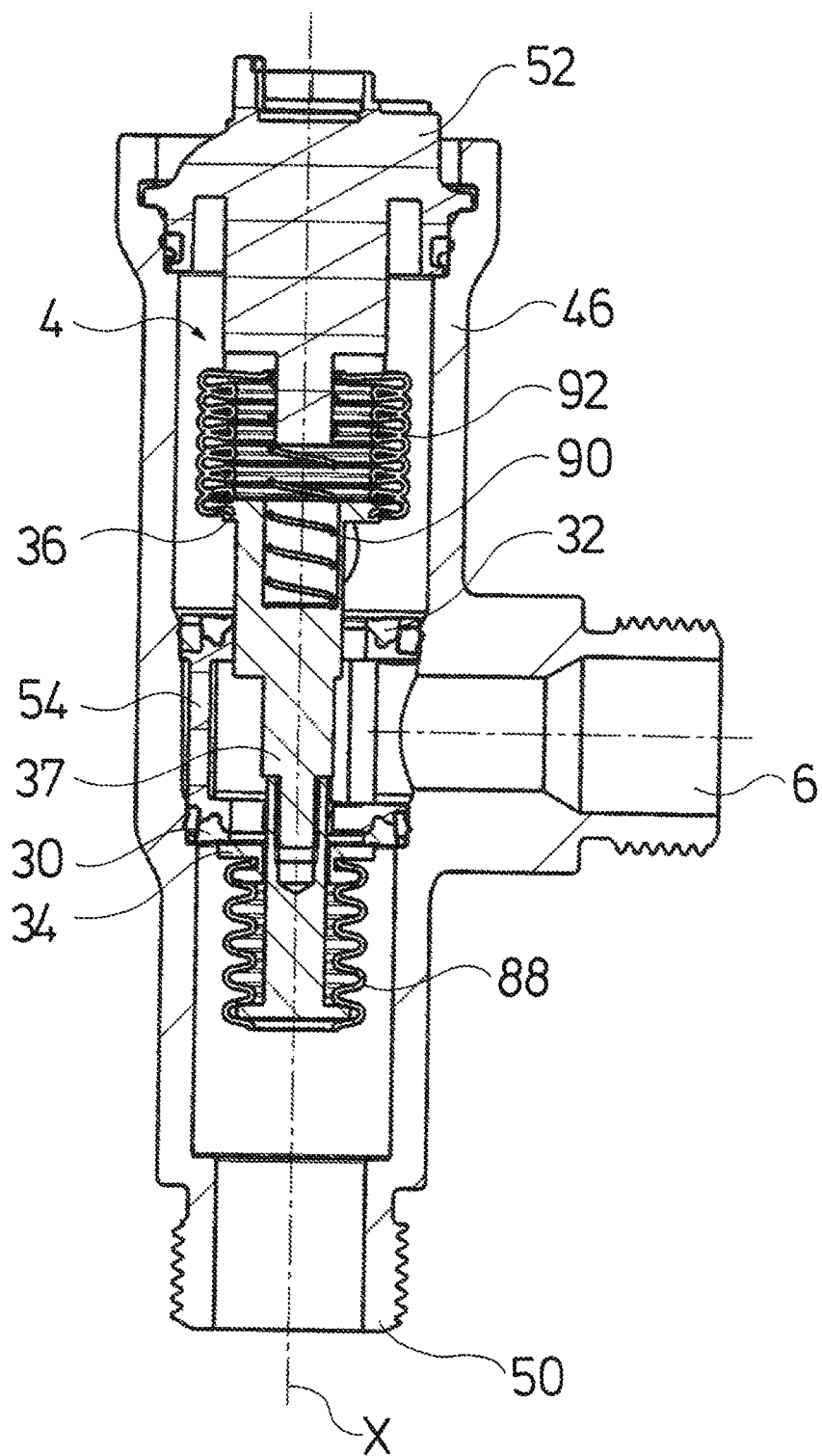
FIG. 17 is a sectional view according to FIG. 16, wherein the switching device is situated in a second switch position.

The embodiment examples according to FIGS. 16 and 17 differs from the embodiment example according to FIGS. 14 and 15 on the one hand by way of the fact that in the idle position which is shown in FIG. 16 and which corresponds to the first switch position, the valve element 36 bears on its sealing seat 32, whereas the valve element 34 is lifted from the valve seat 30. This means that the circuit across the secondary heat exchanger 16 is open in this starting position, as is described by way of FIGS. 1 to 4, whereas the flow path through the heating circuit is open in the first switch position with the embodiment example according to FIGS. 14 and 15. Moreover, with the embodiment example according to FIGS. 16 and 17, the valve element 34 is connected to the connection element 37 via a bellows 88 which corresponds to the bellows 86. The bellows 88 also serves as a damper when the valve element 34 abuts on the valve seat 30. The valve element 36 is moreover supported on the closure 52 via a spring 90 which with regard to its function corresponds to the spring 82 in FIGS. 14 and 15. A further bellows 92 is arranged in a manner surrounding the spring 90 and is arranged between the closure 52 and the valve element 36 and serves as a further damper. The bellows 92 likewise comprises an opening which acts as a throttle location and which for example can be formed in the contact region to the valve element 36. With this embodiment, the valve element 36 is held on the valve seat 32 by way of the pressure prevailing at the second entry 24, as long as the pump assembly 2 is operated in the first operating condition at a higher speed. If this holding force is reduced by way of reducing the speed of the pump assembly 2 in a second operating condition, then the self-holding condition is lifted and the valve element 34 is pulled against the valve seat 30 by way of the flow energy which is still present in the fluid. The abutment is thereby damped via the bellows 88 and 92, so that a direct rebound is prevented. An adequate holding pressure then acts upon the valve element 34, either by way of the pressure prevailing with the continued operation of the pump assembly or however by way of the restarting operation of the pump assembly 2 in the first operating condition, so that again a self-holding condition is achieved.

Figure 18:
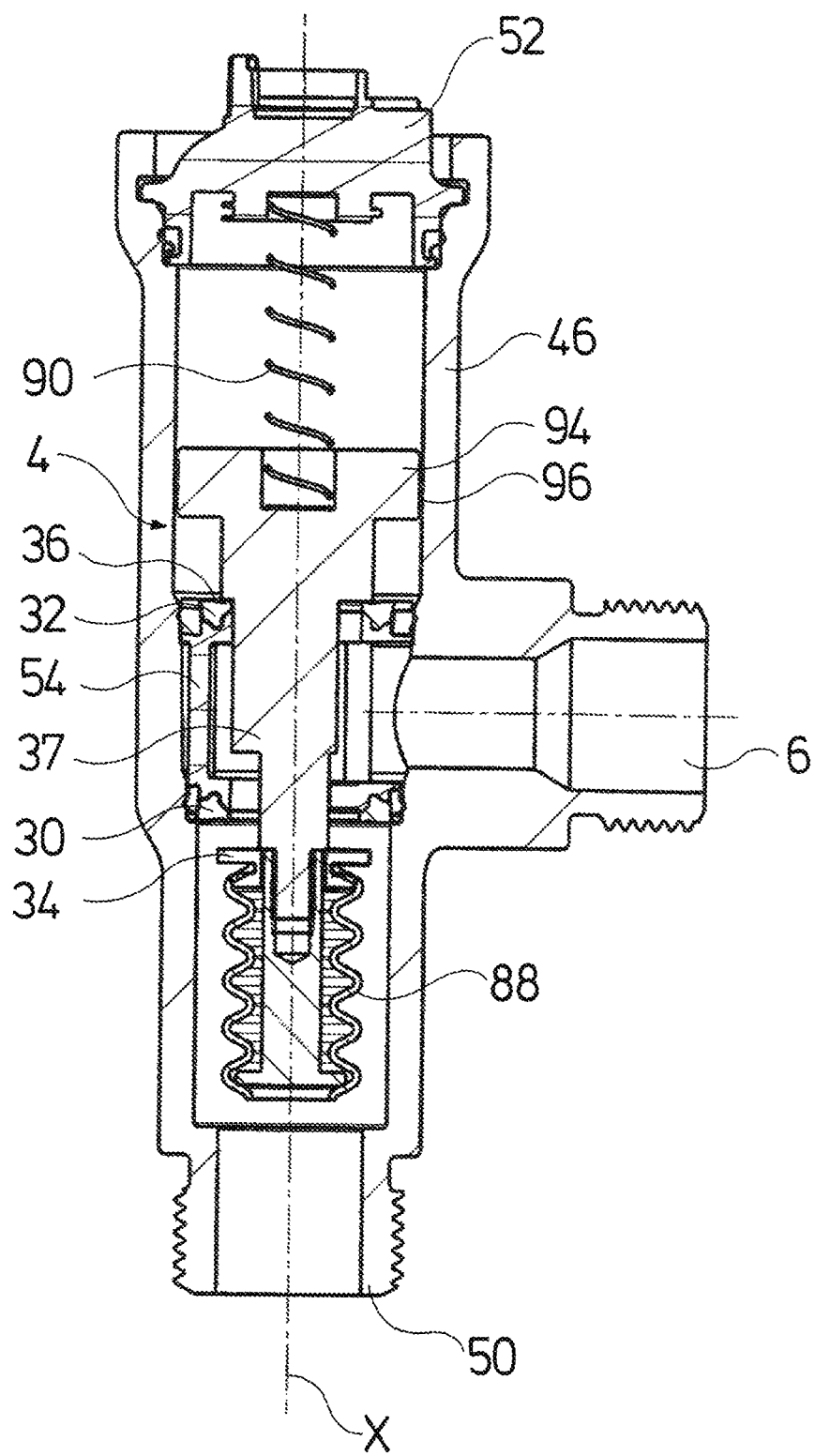
FIG. 18 is a sectional view of a switching device according to a seventh embodiment, wherein the switching device is situated in a first switch position.
Figure 19:
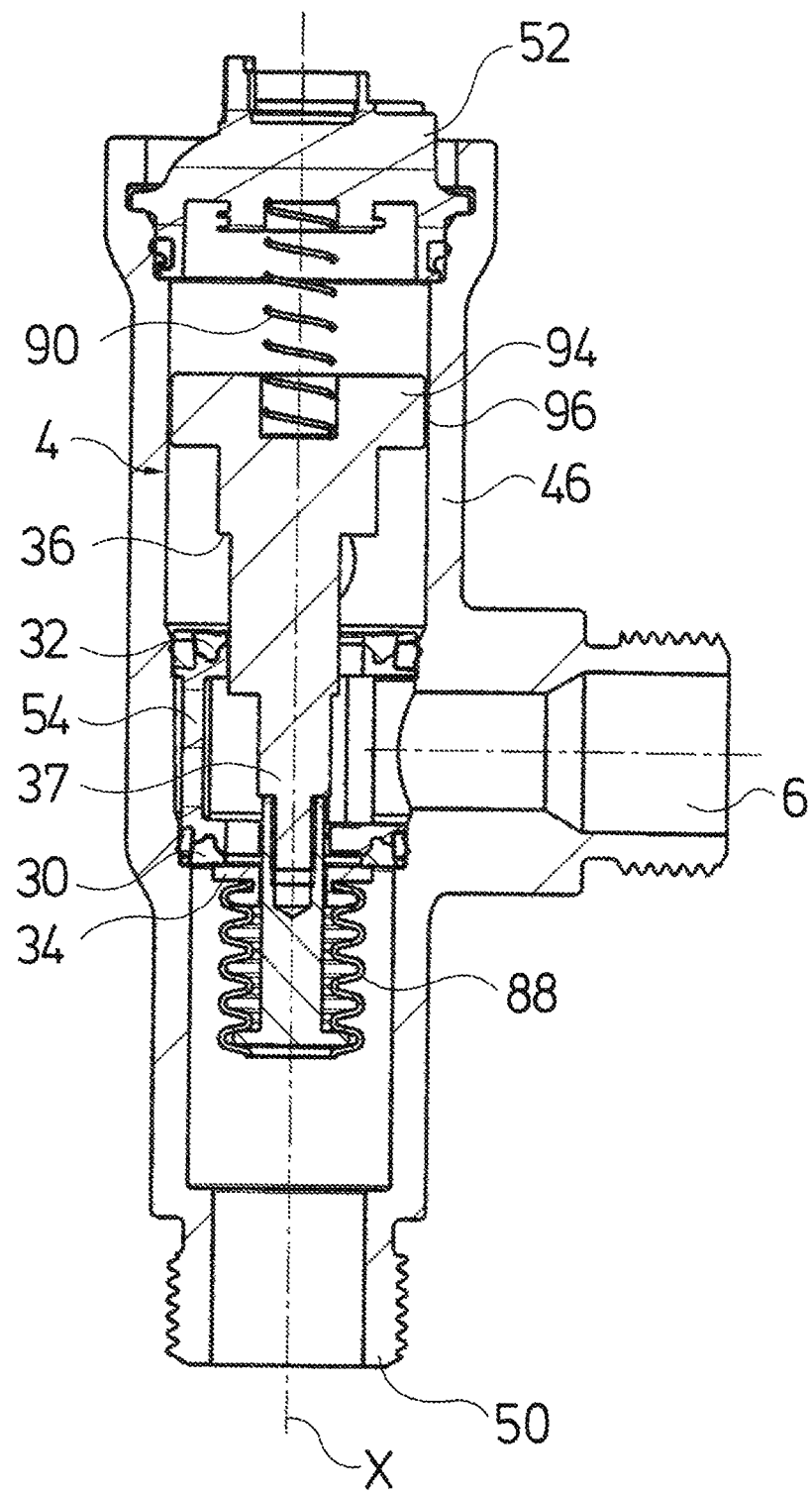
FIG. 19 is a sectional view according to FIG. 18, wherein the switching device is situated in a second switch position.
Figure 20:
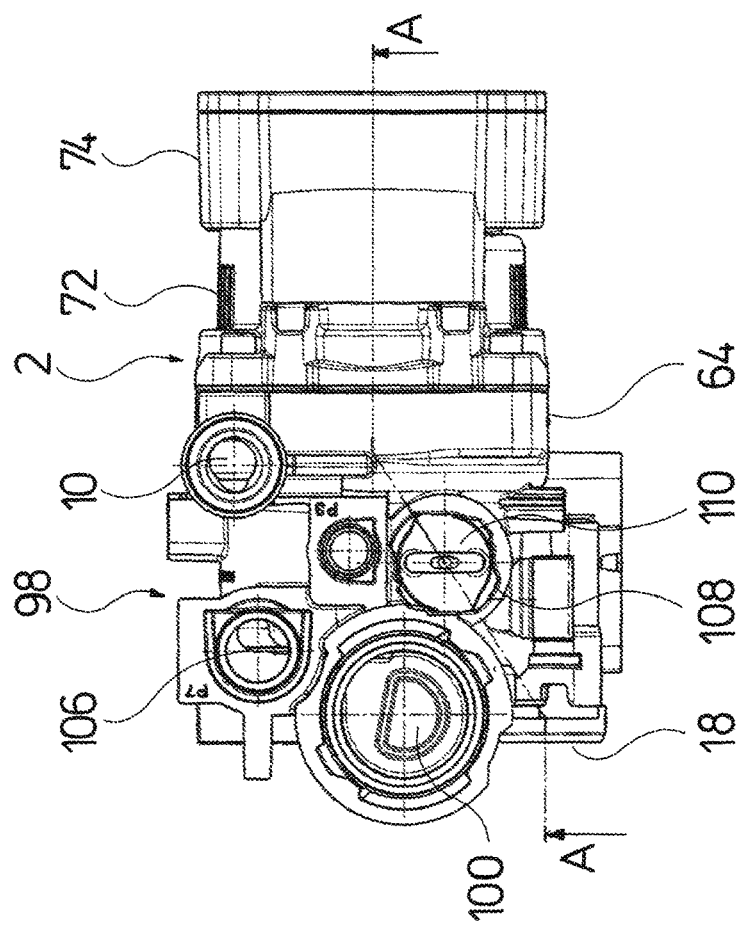
FIG. 20 is a lateral view of a hydraulic block with a switching device according to the invention.
Figure 21:
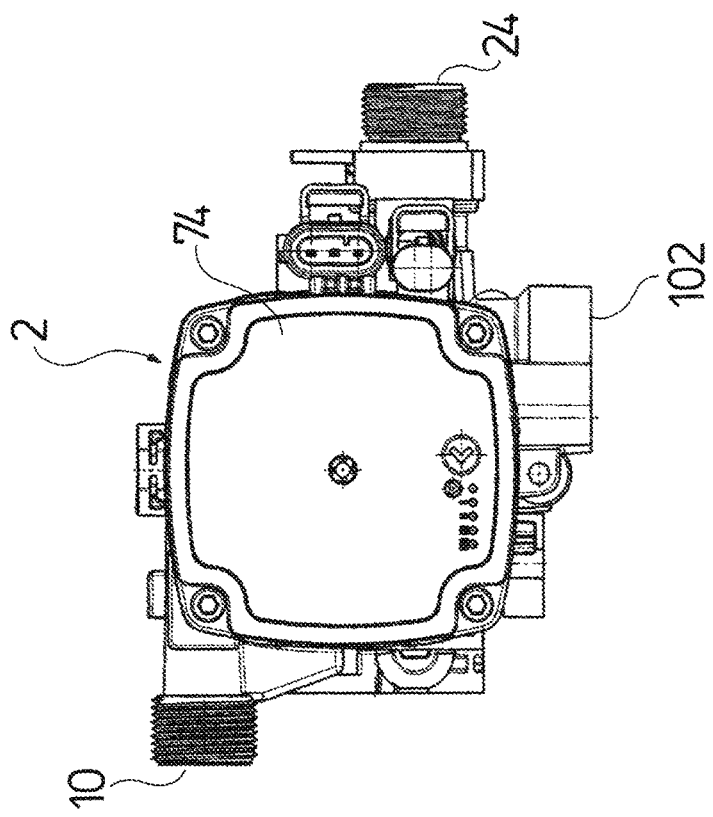
FIG. 21 is a plan view of the hydraulic block according to FIG. 20.
Figure 22:
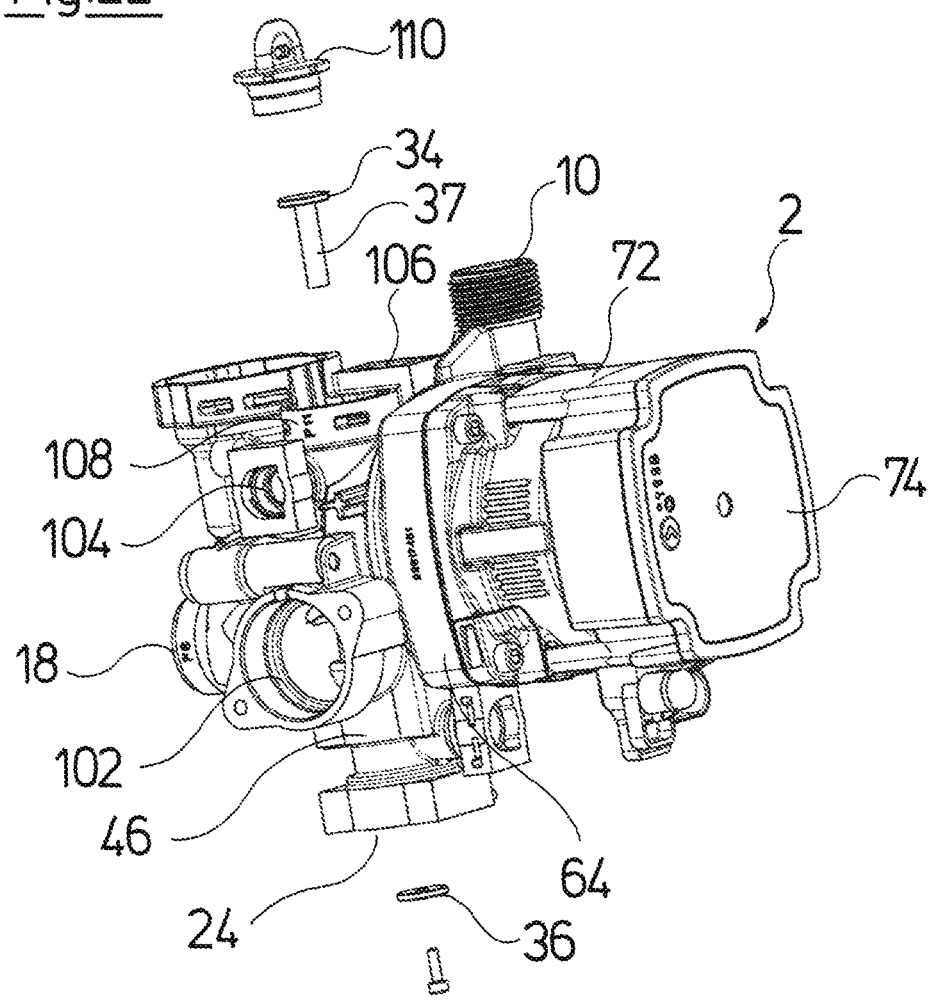
FIG. 22 is a perspective view of the hydraulic block according to FIGS. 20 and 21 showing the switching device in an exploded perspective view.
Figure 22:
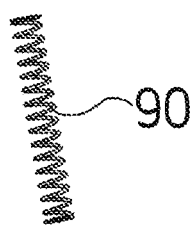
Figure 22:
Figure 22:
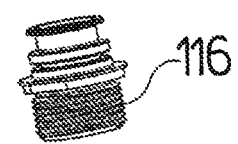

The embodiment example according to FIGS. 18 and 19 differs from the embodiment examples according to FIGS. 16 and 17 by way of the fact that the bellows 92 is done away with and a plunger 94 is integrally formed on the valve element 36 instead, wherein this plunger is movable in the housing 46 in the axial direction X. An annular gap 96 which acts as a throttle location is formed between the peripheral wall of the plunger 94 and the inner wall of the housing 46. This throttle location leads to a damping given the movement of the plunger 94, since the fluid must flow through the annular gap 96 from the one side to the other side of the plunger 94. Thus, the plunger 94 with the annular gap 96 assumes the function of the previously described bellows 92. The manner of functioning of the switching device according to FIGS. 18 and 19 is otherwise the same as is described by way of FIGS. 16 and 17.

The pump assembly 2 is preferably configured as a pump assembly with an electric drive motor which is activated via a frequency converter. The use of such an activation has the advantage that the pump assembly 2 can be additionally braked by opposing magnetic fields on reducing the rotational speed. A more rapid speed reduction is therefore achieved. The applied bags or bellows 40, 58, 86, 88 and 92 are preferably manufactured of rubber or a suitable elastomer.

FIGS. 20 to 25 by way of example show the integration of a switching device according to the invention into a hydraulic block for a heating facility. Herein, it is to be understood that switching devices, as have been described beforehand, can likewise be integrated into such a hydraulic block in a corresponding manner. The hydraulic block forms an integrated construction unit which can be integrated into a heating facility, in particular into a compact heating facility. This hydraulic construction unit groups together different hydraulic elements of a heating facility and creates the necessary hydraulic connections in its inside.

The shown hydraulic block as an essential component comprises a pump assembly 2. This pump assembly 2 comprises a motor housing 72 with the electrical drive motor 70 which is arranged therein as well as an electronics housing 74 which is attached at the axial side and in which the control device 28 is arranged. The pump casing 64 of the pump assembly 2 is an integral constituent of the hydraulic block 98 which furthermore comprises further hydraulic flow paths and components. In particular, a switching device 4 according to the invention is arranged in the inside of the hydraulic block 98. The switching device 4 here is configured as a switch-over device which switches over the hydraulic flow path between a secondary heat exchanger 16 and a heating circuit through the radiator 20, as has basically been described by way of FIGS. 1 to 4.

The hydraulic block 98 comprises a first inlet 18 or first connection 18 which here is formed for the direct connection to the secondary heat exchanger 16. The first inlet 18 bears on the rear side of the hydraulic block 98, whilst the pump assembly 2 is situated at the front side. The envisaged installation position of the hydraulic block 98 in a heating facility is thereby such that the rotation axis Y of the pump assembly 2 extends horizontally. The hydraulic block 98 furthermore comprises a second inlet 24 which is configured for connection to a heating circuit through the radiator 20 (see preceding description). The second inlet 24 here is configured as a threaded connection which extends downwards in the envisaged installation position. This is preferred since the conduit connections for the external pipework are preferably directed downwards in the case of common hydraulic blocks for heating facilities, in particular compact heating facilities. The hydraulic block 98 moreover comprises a delivery-side connection 10 which is provided for connection to the aforementioned primary heat exchanger 12 and in the pump casing 64 is connected to the delivery side of the pump assembly 2. The hydraulic block 98 further comprises yet an end-vent receiver 100, in which an end-vent which is not shown is inserted. Furthermore, further openings as assembly openings and receivers are provided for sensors, such as for example the assembly opening 102 which permits an access to the switching device 4 for maintenance and assembly purposes. The openings 104 and 106 function for example as receivers for pressure and/or temperature sensors.

The switching device 4 in the embodiment according to FIGS. 20 to 25 is configured such that the fluid which flows in the facility or the liquid which flows in the facility serves as an energy store. This means that the kinetic energy of the liquid is utilized for switching over the switching device. The switching device in this embodiment example also comprises two valve elements 34 and 36 which are connected to one another via a connection element 37. The switching device 4 furthermore comprises a spring 90 which acts as a restoring spring and which with regard to its function corresponds to the spring 90 which is described by way of FIGS. 18 and 19.

In this embodiment example, the housing 46 of the switching device 4 is likewise integrated into the hydraulic block 98 and in particular is configured as one piece with the pump casing 64 and the connecting flows paths to the inlets 18 and 24. A connection space 38 which is connected to the suction side or to a suction connection in the pump casing 64 and thus forms a suction-side flow path to the impeller 68 is situated in the housing 46. The connection of the connection space 38 into the pump casing 64 with regard to its function corresponds to the outlet 6 in the embodiment example according to FIGS. 18 and 19. Two valve seats 30 and 32 which are away from one another are situated on the connection space 38. The valve element 34 can come into sealing bearing contact on the valve seat 30, whereas the valve element 36 can come into sealing bearing contact on the valve seat 32. The valve seats 30 and 32 in this embodiment are integrally formed with the housing 46, in particular as one piece with this. The valve elements 34 and 36 are assembled through the inlet 24 and an assembly opening 108 which is situated at an opposite end of the housing 46, wherein the assembly opening 108 is subsequently closed by a closure element 110. However, other assembly types would also conceivable, in particular if the valve seats 30 and 32 are likewise configured as an insert, as has been described by way of FIGS. 18 and 19.

Figure 23:
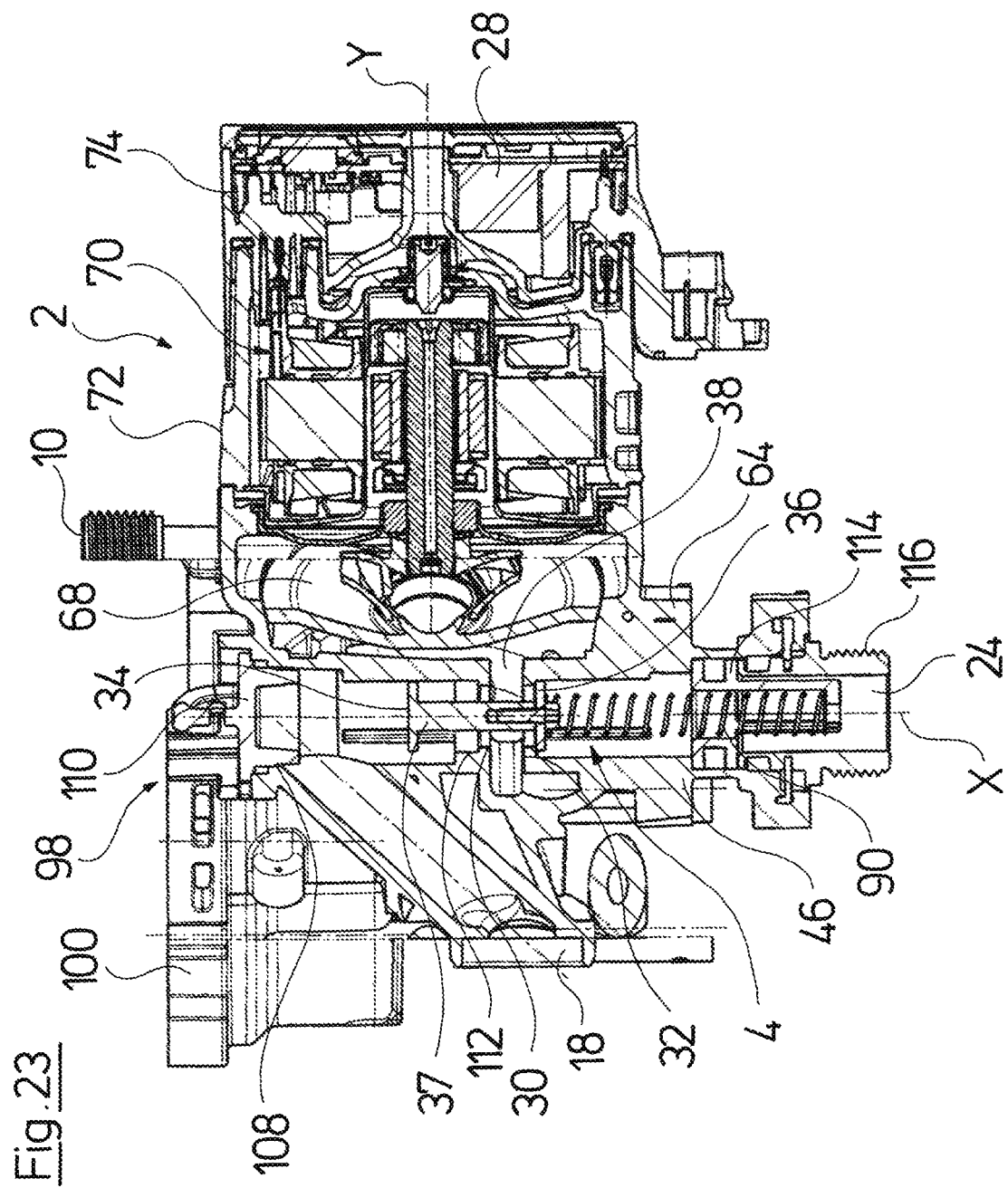
FIG. 23 is a sectional view taken along the line A-A in FIG. 20 in one of three different switching positions of the switching device.
Figure 24:
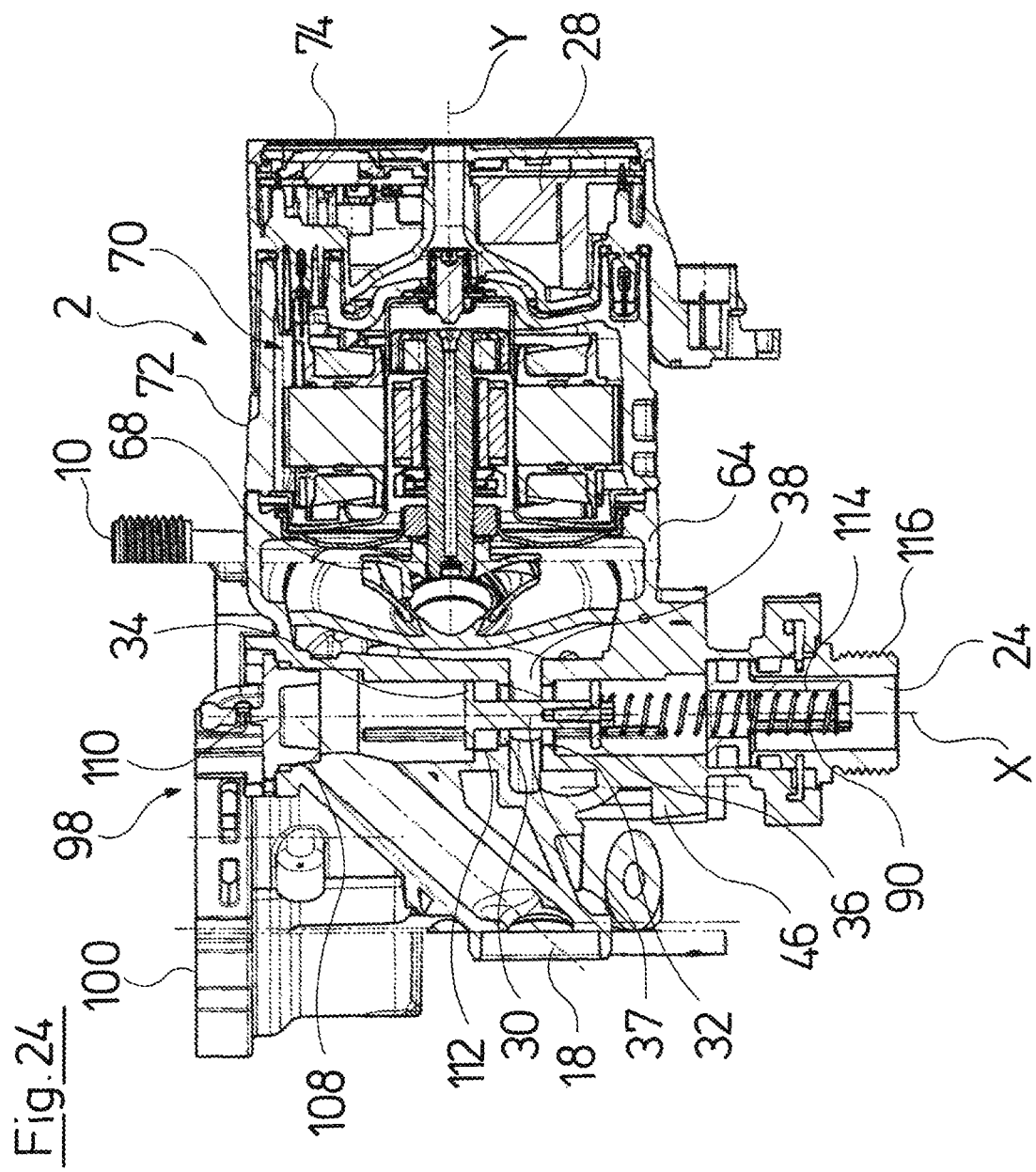
FIG. 24 is a sectional view taken along the line A-A in FIG. 20 in another of three different switching positions of the switching device.
Figure 25:
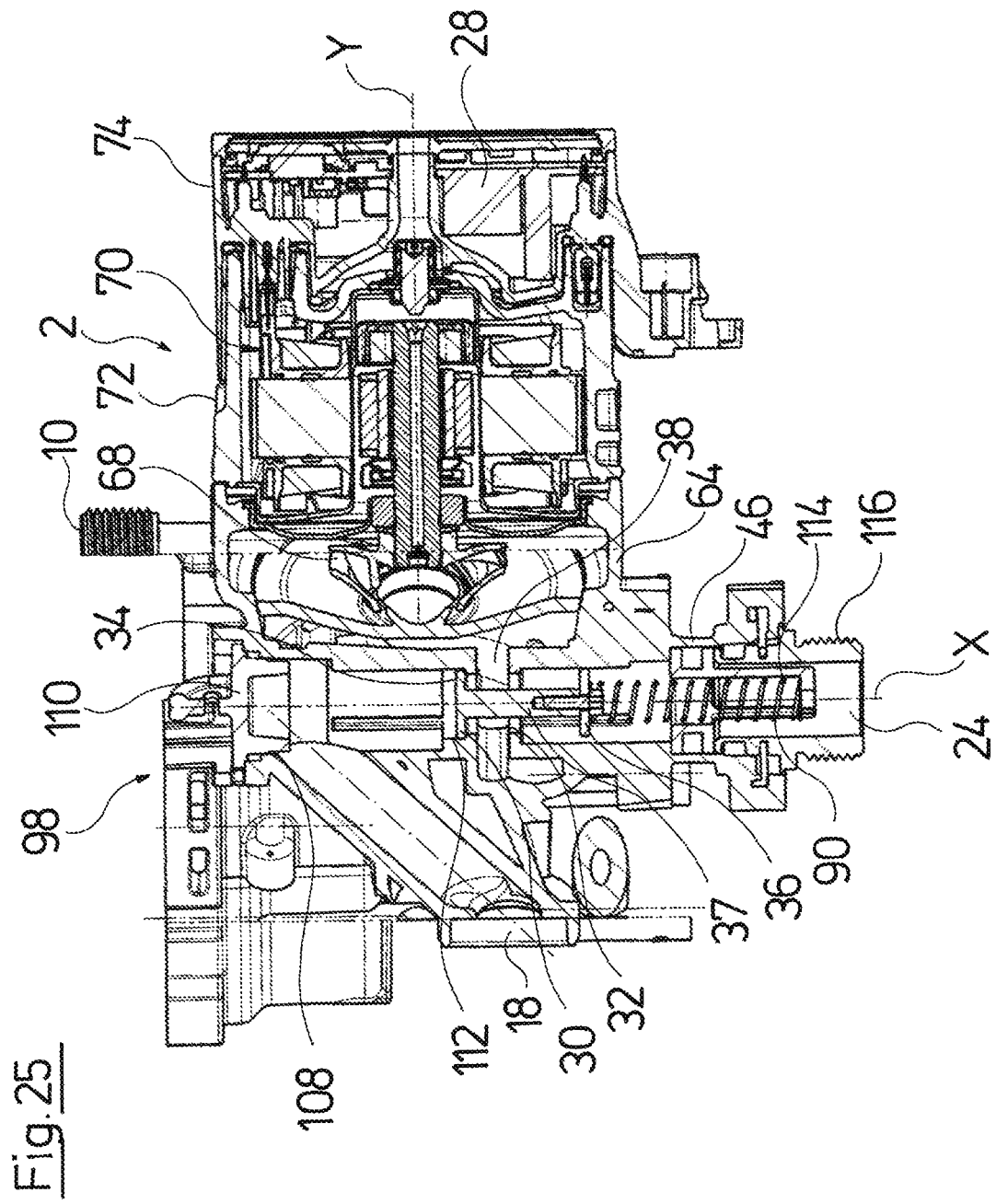
FIG. 25 is a sectional view taken along the line A-A in FIG. 20 in another of three different switching positions of the switching device.

The manner of functioning of the switching device 4 in the embodiment according to FIGS. 20 to 25 corresponds essentially to the functioning manner if the switching device according to FIGS. 18 and 19, which is why the corresponding description is referred to. In contrast to the previously described embodiment example according to FIGS. 18 and 19, with this example the bellows 88 and the piston are done away with. In this embodiment example in fact, a damping is achieved by way of the valve element 34 itself acting as a piston which towards the end of its movement path immerses into a narrowing 112 which is adjacent to a valve seat 30, as is shown in FIGS. 24 and 2. The narrow location 112 is configured cylindrically to the longitudinal axis X of the switching device 4 and has a peripheral contour which with regard to its shape corresponds to the peripheral contour of the valve element 34, which is to say in particular is circular. If the valve element 34 is moved towards the valve seat 30 by the kinetic energy of the flow after switching the pump assembly 2 into its second operating condition, then after a certain path the valve element 34 immerses into the narrowing 112, as is shown in FIG. 24. By way of this, the flow path through the valve seat 30 is already essentially closed and one succeeds in the pressure at the node point 14 (see FIGS. 1 to 4) now acting upon the valve element 34 and then pressing this further onto the valve seat 30 on switching again into the first operating condition of the pump assembly, as is shown in FIG. 25. A damping of the movement of the valve element 34 with the connection element 37 and the valve element 36 is achieved by the described narrowing, and this prevents the rebound of the valve element 34 from the valve seat 30. If the valve element 34 enters into the narrowing 112, then the flow path through the associated valve seat 30 is already essentially closed, and the valve element 34 and the connection element 37 with the further valve element 36, despite this, can move further by a certain amount, by which means the rebounding is prevented. If now the pump assembly is switched back again into the first operating condition whilst the flow path through the valve seat 30 is essentially closed, then the valve element 34 remains in this switch position, with the valve element 34 in bearing contact on the valve seat 30. If the pump assembly is subsequently switched back into the second operating condition, the pressure at the node point 14 reduces again to such an extent that the spring 90 moves the valve elements 34 and 36 back again into the first switch position, which is shown in FIG. 23. This switch position corresponds to the idle position. The spring is supported on a spring carrier 114 which is fixed on the inlet 24 by a threaded insert 116 in the housing 46.

While specific embodiments of the invention have been shown and described in detail to illustrate the application of the principles of the invention, it will be understood that the invention may be embodied otherwise without departing from such principles.

The invention claimed is:

1. A hydraulic system comprising:
    at least one pump assembly configured with a first operating condition and a second operating condition; and
    a switching device configured to flow fluid through said switching device in a first flow configuration, said switching device also being configured to flow fluid through said switching device in a second flow configuration, said first flow configuration being different from said second flow configuration, said switching device having a movable valve element structure, movable between a first switch position for said first flow configuration, and a second switch position for said second flow configuration, said valve element structure being moved between said switch positions by changes in fluid flow caused by said first and second pump states, wherein the switching device is configured such that on operation of the pump assembly in the first operating condition, the switching device is held stable in each of the two switch positions in each case by the hydraulic forces in the system, and in the second operating condition of the pump assembly, the switching device is moved from the first switch position into the second switch position assisted by switching energy stored in the first operating condition, wherein the hydraulic system is configured such that in the first operating condition the switching energy is stored independently of a switching of the switching device between the switch positions.

2. The hydraulic system according to claim 1, further comprising at least one energy store which is configured such that on operation of the pump assembly in the first operating condition, the at least one energy store is subjected to a hydraulic pressure in the hydraulic system and stores switching energy in a charging procedure, wherein the switching device remains in its assumed switch position, and the energy store is coupled to the switching device with a force-transmitting connection, such that in the second operating condition of the pump assembly, the switching device is moved into the second switch position by a force produced by the energy store.

3. The hydraulic system according to claim 2, wherein the energy store is part of the switching device or a fluid in motion functions as an energy store or both the energy store is part of the switching device and a fluid in motion functions as a energy store.

4. The hydraulic system according claim 2, wherein the energy store is configured such that on operation of the pump assembly in the first operating condition, a hydraulic pressure counteracts a force which is produced by the energy store and which acts upon the switching device, such that a switching procedure is prevented.

5. The hydraulic system according to claim 2, wherein the energy store is a spring store, a magnetic, hydraulic or pneumatic energy store.

6. The hydraulic system according to claim 2, wherein the energy store comprises a pressure surface or is connected to a pressure surface, which is connected to a flow path in the hydraulic system such that the pressure surface is subjected to a fluid pressure produced by the pump assembly.

7. The hydraulic system according to claim 2, further comprising an elastically deformable damping element wherein the energy store is connected to the switching device via the elastically deformable damping element which is configured such that the elastically deformable damping element deforms during the charging procedure of the energy store, without moving the switching device, wherein the damping element is preferably arranged such that on operation of the pump assembly in the first operating condition, a hydraulic pressure which is produced by the pump assembly and which counteracts a force produced by the energy store and acting upon the damping element amid elastic deformation of the damping element, acts upon the damping element.

8. The hydraulic system according to claim 7, wherein the damping element has such damping characteristics that a recovery of the damping element is effected more slowly than a discharging of the energy store, given a reduction of the hydraulic pressure.

9. The hydraulic system according to claim 7, wherein the damping element is configured as a size-changeable volume which can be filled and emptied with a fluid via a throttle location, wherein the size-changeable volume is connected via the throttle location to a second size-changeable compensation volume, into a closed system.

10. The hydraulic system according to claim 7, wherein the damping element is provided with a restoring element comprising a restoring spring which effects a recovery.

11. The hydraulic system according to claim 7, wherein the pump assembly comprises a control device configured such that for initiating a switching procedure of the switching device for a switching pause, the control device changes the operation of the pump assembly from the first operating condition into the second operating condition, wherein the switching pause is shorter than a time interval which the recovery of the damping elements takes.

12. The hydraulic system according to claim 1, wherein the pump assembly is operated with a speed above a limit speed in the first operating condition, and with a speed which is smaller than or equal to the limit speed, or is at standstill, in the second operating condition.

13. The hydraulic system according to claim 1, wherein the pump assembly comprise a speed controller for changing the speed of the pump assembly, wherein the speed controller comprises a braking circuit which actively brakes the pump assembly given a reduction of the speed.

14. The hydraulic system according to claim 1, wherein the switching device is configured as a switch-over device for switching over a flow path between at least two branches of the hydraulic system.

15. The hydraulic system according to claim 1, wherein the hydraulic system is a circulation system and the pump assembly is a circulation pump assembly.

16. The hydraulic system according to claim 1, further comprising a control device configured to change an operating condition of the pump assembly between the first and the second operating condition, in order to initiate a switching procedure of the switching device.

17. The hydraulic system according to claim 1, wherein the switching device is configured as a switch-over valve with two valve seats, and comprises two associated valve bodies which are connected to one another and which are arranged such that when a valve body sealingly bears on the associated valve seat, the other valve body is simultaneously distanced from the associated valve seat, wherein the switch-over valve is arranged in the hydraulic system such that on operation of the pump assembly in the first operating condition, a hydraulic pressure acts upon that valve body which bears on the associated valve seat, such that the valve body is held in contact on the valve seat.

18. The hydraulic system according to claim 1, wherein the switching device comprises at least one damping device which acts such that a direct impact of the switching device on reaching at least one of the two switching position is prevented.

19. The hydraulic system according to claim 1, wherein the switching device comprises at least one linearly movable valve body which in one switch position sealingly bears on an associated valve seat and is configured such that the valve body with movement thereof passes an annular wall which surrounds an outer periphery of the valve body and which reduces the flow cross section, before reaching the valve seat.

20. The hydraulic system according to claim 1, wherein the switching device is integrated into a pump casing of the pump assembly.

21. The hydraulic system according to claim 1, wherein the switching device together with a pump assembly is integrated into a hydraulic block for a heating facility.

22. A method for operation of a hydraulic system with a pump assembly and with a switching device with at least two different flow configurations, the method comprising the steps of:

holding the switching device in a first operating condition of the pump assembly stable in each one of the flow configurations in each case by way of hydraulic forces in the system, and utilizing switching energy, which is stored previously by way of operation of the pump assembly in the first operating condition, in an energy store or in the hydraulic system or both in an energy store and in the hydraulic system, for switching over the switching device from a first into a second flow configuration in a second operating condition of the pump assembly.

23. The method according to claim 22, wherein a hydraulic inertia force of the fluid flowing in the system is utilized for switching over the switch-over device.

24. A hydraulic system comprising:
a pump configured with a first pump state and a second pump state, said first pump state and said second pump state being different, said first pump state pumping fluid at a higher flow or pressure than said second pump state, said second pump state includes not pumping fluid;
a switching device in fluid communication with said pump, said switching device having a first switch state configured to flow fluid through said switching device in a first flow configuration, said switching device having a second switch state configured to flow fluid through said switching device in a second flow configuration, said first flow configuration being different from said second flow configuration, said switching device having a movable valve element structure, movable between a first position for said first flow configuration, and a second position for said second flow configuration, said valve element structure being moved between said positions by changes in fluid flow caused by said first and second pump states, said switching device being configured to stably remain in either one of said first and second flow configurations by hydraulic forces in the system when said pump is in said first pump state, said switching device being configured to always eventually return to said first flow configuration when said pump is not pumping fluid.

25. A hydraulic system in accordance with claim 24, further comprising:
an energy storage device connected to said valve element structure, said energy storage device being configured to store energy from the fluid flowing from said pump, said energy storage device being configured to transfer energy to said valve element structure to move said valve element structure between said positions.

* * * * *